(12) United States Patent  
Hasegawa et al.

(10) Patent No.: US 7,008,703 B2  
(45) Date of Patent: Mar. 7, 2006

(54) MAGNETIC DETECTING ELEMENT HAVING SECOND ANTIFERROMAGNETIC LAYER OVERLYING SECOND FREE MAGNETIC LAYER EXTENDING IN TRACK WIDTH DIRECTION BEYOND TRACK WIDTH

(75) Inventors: Naoya Hasegawa, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/611,555

(22) Filed: Jul. 1, 2003

(65) Prior Publication Data

US 2004/0106012 A1 Jun. 3, 2004

(30) Foreign Application Priority Data

Jul. 2, 2002 (JP) ............................. 2002-192951

(51) Int. Cl.  
*G11B 5/127* (2006.01)

(52) U.S. Cl. ................ 428/811.5; 428/811.2; 360/324.12

(58) Field of Classification Search .......... None  
See application file for complete search history.

(56) References Cited

U.S. PATENT DOCUMENTS

| | | | |
|---|---|---|---|
| 6,295,186 B1 | 9/2001 | Hasegawa et al. | |
| 6,344,954 B1 | 2/2002 | Redon et al. | |
| 6,700,753 B1 * | 3/2004 | Singleton et al. | 360/324.1 |
| 6,754,056 B1 * | 6/2004 | Ho et al. | 360/324.2 |
| 2001/0004307 A1 | 6/2001 | Saito et al. | |
| 2001/0055184 A1 | 12/2001 | Shimazawa et al. | |
| 2002/0036878 A1 * | 3/2002 | Umetsu | 360/324.12 |
| 2002/0097536 A1 * | 7/2002 | Komuro et al. | 360/324.2 |
| 2002/0097540 A1 * | 7/2002 | Hayashi et al. | 360/324.12 |
| 2004/0196598 A1 * | 10/2004 | Zheng et al. | 360/324.12 |

FOREIGN PATENT DOCUMENTS

| | | |
|---|---|---|
| GB | 2 390 217 | 12/2003 |
| JP | 10-124823 | 5/1998 |
| JP | 2000-293822 | 10/2000 |
| JP | P2002-111095 A * | 4/2002 |
| WO | WO 02/43164 A1 | 5/2002 |
| WO | WO 02/073226 A3 | 9/2002 |

OTHER PUBLICATIONS

JPO Abstract Translation of JP 2002-111095-A (Pat-No: JP02002111095A).*  
JPO Abstract Translation of JP 2002-050011.*

* cited by examiner

*Primary Examiner*—Kevin M. Bernatz  
(74) *Attorney, Agent, or Firm*—Brinks Hofer Gilson & Lione

(57) ABSTRACT

A magnetic detecting element has a multilayer laminate including a first free magnetic layer. A second antiferromagnetic layer is disposed on each side surface of the multilayer laminate in the track width direction. A second free magnetic layer is disposed from the upper surface of the second antiferromagnetic layer to the upper surface of the first free magnetic layer. Thus, the shield distance in the central portion of the element can be prevented from increasing, and the insulation between a shield layer and an electrode layer is enhanced.

19 Claims, 19 Drawing Sheets

MAGNETIC DETECTING ELEMENT HAVING SECOND ANTIFERROMAGNETIC LAYER OVERLYING SECOND FREE MAGNETIC LAYER EXTENDING IN TRACK WIDTH DIRECTION BEYOND TRACK WIDTH

This application claims the benefit of priority to Japanese Patent Application 2002-192951, filed Jul. 2, 2002.

BACKGROUND OF THE INVENTION

1. Field of the Invention

The present invention relates to magnetic detecting elements used for hard disk devices and magnetic sensors. In particular, the present invention relates to a magnetic detecting element using an exchange bias method, adapted to the demand for a narrow track width in which the distance between shield layers is reduced while the magnetization of a free magnetic layer is suitably controlled, in which the insulation is ensured between the shield layers and the other layers of the magnetic detecting element, and in which the effective reproduction track width is reduced, and to a method for manufacturing the same.

2. Description of the Related Art

FIG. 20 is a fragmentary sectional view of the structure of a known magnetic detecting element, viewed from a side opposing a recording medium.

The magnetic detecting element includes a lower shield layer 1 formed of a NiFe alloy or the like and a lower gap layer 2 formed of $Al_2O_3$ or the like on the lower shielding layer 1.

As shown in FIG. 20, a first antiferromagnetic layer 3, a pinned magnetic layer 4, a nonmagnetic material layer 5, and a free magnetic layer 6 are deposited in that order on the lower gap layer 2. Also, a second antiferromagnetic layer 7 is formed on the upper surface of the free magnetic layer 6 with a space having a predetermined width (=track width Tw) in the track width direction, or the X direction in shown in the drawing, and an electrode layer 8 is formed on the second antiferromagnetic layer 7.

Furthermore, an upper gap layer 9 is formed from the upper surface of the electrode layer 8 to the upper surface of the free magnetic layer 6, and, further, an upper shielding layer 10 is formed on the upper gap layer 9.

The known magnetic detecting element, shown in FIG. 20, has a so-called current-in-plane (CIP) structure in which the electrode layer 8 is disposed on each side of the track width direction (X direction) and, thus, a sense current flows in a direction parallel to the surface of each layer in the multilayer laminate 11 including from the first antiferromagnetic layer 3 to the free magnetic layer 6.

FIG. 21 is a fragmentary sectional view of the structure of anther known magnetic detecting element, viewed from a side opposing a recording medium. This magnetic detecting element has a so-called current-perpendicular-to-plane (CPP) structure in which shield layers 13 and 14, which double as electrodes, are formed on both upper and lower sides of the multilayer laminate 11 in the thickness direction (Z direction in the drawing) and, thus, a sense current flows in each layer of the multilayer laminate 11 in the thickness direction. The shield layer 13 is referred to as a lower shield layer and the shield layer 14 is referred to as an upper shield layer.

In the magnetic detecting element Shown in FIG. 21, an antiferromagnetic layer 7 is covered with an insulating layer 12. The insulating layer 12 prevents the sense current flowing from the upper shield layer 14 to the multilayer laminate 11 from diverging into the second antiferromagnetic layer 7.

Each of the magnetic detecting elements shown in FIGS. 20 and 21 has a so-called exchange bias structure in which the second antiferromagnetic layer 7 is disposed on the free magnetic layer 6 and the magnetization of both ends 6a of the free magnetic layer 6 is fixed in the X direction by the exchange coupling magnetic field generated between the second antiferromagnetic layer 7 and the ends 6a of the free magnetic layer 6, which are in contact with each other.

On the other hand, the central portion 6b of the free magnetic layer 6 is put into a single magnetic domain state in the X direction, by a bias magnetic field generated by exchange interaction in the free magnetic layer 6, and the magnetization changes in response to an external magnetic field.

In the magnetic detecting elements shown in FIGS. 20 and 21, it is desired to reduce the track width in order to adapt them to the demand for high recording density. Accordingly, the track width Tw, which is defined by the width in the x direction of the space in the second antiferromagnetic layer 7, needs to be further reduced.

Unfortunately, the reduction of the track width in the magnetic detecting elements shown in FIGS. 20 and 21 has brought about the following problems.

In the magnetic detecting element shown in FIG. 20, the second antiferromagnetic layer 7 and the electrode layer 8 are disposed on each end portion 6a of the free magnetic layer 6, and the total thickness of these two layers is T1. Therefore, the distance between the lower shield layer 1 and the upper shield layer 10 (hereinafter simply referred to as the distance between the shield layers 1 and 10) is increased to T2 at the end portions 6a of the free magnetic layer 6, while the distance between the shield layers 1 and 10 is T3 at the central portion 6b of the free magnetic layer 6, in which neither the second antiferromagnetic layer 7 nor the electrode layer 8 is formed. Such increase of the distance between the shield layers undesirably increases the actual track width contributing to magnetic reproduction (effective reproduction track width) and the PW50. The PW50 refers to the half-width of the reproduction waveform of a solitary wave.

As described above, although the width of the space in the second antiferromagnetic layers 7 is reduced, the resulting magnetic detecting element cannot be suitably adapted to the demand for a narrow track width in practice because of the increase of the effective reproduction track width and others.

This problem also occurs in the CPP magnetic detecting element shown in FIG. 21, in which the second antiferromagnetic layer 7 is disposed on both end portions 6a of the free magnetic layer 6. Therefore, the distance between the shield layers 13 and 14 is increased to T4 at both end portions 6a of the free magnetic layer 6, while the distance between the shield layers 13 and 14 is T5 at the central portion 6b of the free magnetic layer 6, which does not have the second antiferromagnetic layer 7. Thus, the actual track width contributing to magnetic reproduction, that is, the effective reproduction track width, and the PW50 are undesirably increased.

Also, since, in the known magnetic detecting elements shown in FIG. 20, the second antiferromagnetic layer 7 and the electrode layer 8 are disposed on each end portions 6a of the free magnetic layer 6, it is difficult to ensure that the upper gap layer 9, which is formed from the upper surfaces of the electrode layer 8 to the upper surface of the central portion 6b of the free magnetic layer 6 through the inner side surfaces 7a and 8a of the antiferromagnetic layer 7 and electrode layer 8, has a predetermined thickness particularly on the inner side surfaces 7a and 8a and at the corners 6a1 between the inner side surfaces 7a and 8a and the upper surface of the central portion 6b of the free magnetic layer 6. Consequently, it is difficult to maintain an adequate insulation between the upper shield layer 10 and the electrode layer 8 and between the upper shield layer 10 and the antiferromagnetic layers 7. Also, as thickness T1, which is the total thickness of the antiferromagnetic layer 7 and the electrode layer 8, becomes larger and the inclination of the inner side surfaces 7a and 8a is steeper, it is more difficult to ensure the insulation.

In addition, since the thicknesses of the gap layers 2 and 9 tends to be reduced in order to reduce the gap length between the shield layers 1 and 10, this problem has become more pronounced.

In the CPP magnetic detecting element shown in FIG. 21, since the thickness of the second antiferromagnetic layer 7 is large, it is difficult to form the insulating layer 2 to a predetermined thickness on the inner side surfaces 7a of the second antiferromagnetic layer 7. Consequently, the insulation between the upper shield layer 14 and the second antiferromagnetic layer 7 is not sufficient and, thus, sense current flowing from the upper shield layer 14 to the multilayer laminate 11 diverges into the second antiferromagnetic layer 7. Thus, reproduction output is reduced and side reading occurs disadvantageously.

As one of solutions to overcome the above-described insulation problem, the thickness of the second antiferromagnetic layer 7 may be reduced. However, a reduced thickness of the second antiferromagnetic layer 7 leads to a reduced intensity of the exchange coupling magnetic field generated between the second antiferromagnetic layer and each end portion 6a of the free magnetic layer 6. As a result, since the magnetization of the end portions 6a of the free magnetic layer 6 is not surely fixed, reproduction characteristics are negatively affected, so that off-track characteristics are degraded and linearity is not sufficiently maintained.

SUMMARY OF THE INVENTION

Accordingly, an object of the present invention is to provided a magnetic detecting element using an exchange bias method, adapted to the demand for a narrow track width in which the distance between the shield layers is reduced while the magnetization of the free magnetic layer is adequately controlled, in which the insulation is ensured between the shield layers and the other layers of the magnetic detecting element, and in which the effective reproduction track width is reduced, and to provide a method for manufacturing the same.

According to an aspect of the present invention, a magnetic detecting element is provided. The magnetic detecting element includes a multilayer laminate including a first antiferromagnetic layer, a pinned magnetic layer, a nonmagnetic material layer, and a first free magnetic layer in that order from the bottom thereof. A second antiferromagnetic layer is disposed in the track width direction at each side of the multilayer laminate in the rack width direction. The magnetic detecting element also includes a second free magnetic layer from the upper surface of the second antiferromagnetic layer to the upper surface of the first free magnetic layer.

In the magnetic detecting element of the present invention, the second antiferromagnetic layer is provided at each side of the multilayer laminate in the track width direction and the second free magnetic layer is provided from the upper surface of the first free magnetic layer to the upper surface of the second antiferromagnetic layer.

The magnetization in the region of the second free magnetic layer opposing the second antiferromagnetic in the thickness direction is fixed in the track width direction, by an exchange coupling magnetic field generated between the second free magnetic layer and the second antiferromagnetic layer. On the other hand, in the central portion of the element, the second free magnetic layer is put into a single magnetic domain state to a small extent because there is no exchange coupling magnetic field. The magnetization of the second free magnetic layer in the central portion is, therefore, sensitively reversible in response to an external magnetic field, as with the first free magnetic layer.

By providing the second antiferromagnetic layer at each side of the multilayer laminate in the track width direction, the distance between shields in each end portion of the element, which is larger than in the central portion, can be reduced in comparison with the known element, in which the second antiferromagnetic layer is provided on each end portion of the free magnetic layer. Consequently, the effective reproduction track width and the PW50 can be prevented from increasing. Since the height of the protuberances of the electrode layer in the end portions with respect to the upper surface of the electrode layer in the central portion can be is reduced, the gap layer from the upper surface of the electrode layer to the upper surface of the multilayer laminate in the central portion can easily be formed to a uniform thickness and, thus, the insulation between the electrode layer and the shield layer can be enhanced.

The magnetic detecting element may further include a nonmagnetic layer between the first free magnetic layer and the second free magnetic layer.

Preferably, the magnetic detecting element includes a ferromagnetic layer between the second antiferromagnetic layer and the second free magnetic layer. By fixing the magnetization of the ferromagnetic layer in the track width direction by the exchange coupling magnetic field generated between the ferromagnetic layer and the second antiferromagnetic layer, exchange interaction occurs between the ferromagnetic layer and the second free magnetic layer in the end portions of the element, thereby suitably fixing the magnetization of the second free magnetic layer in the end portions.

The magnetic detecting element may further include a nonmagnetic layer between the ferromagnetic layer and the second free magnetic layer.

Preferably, the magnetic detecting element includes a specular layer on the upper surface of the second free magnetic layer in at least the region opposing the multilayer laminate in the thickness direction. Preferably, the magnetic detecting element includes a specular layer between the first free magnetic layer and the second free magnetic layer. Preferably, the specular layer is formed of an oxide selected from the group consisting of Fe—O, Ni—O, Co—O, Co—Fe—O, Co—Fe—Ni—O, Al—O, Al-Q-O, and R—O; a nitride selected from the group consisting of Al—N, Al-Q'-N and R'—N; or a semimetallic whistler alloy, wherein Q is at least one selected from the group consisting of B, Si, N, Ti, V, Cr, Mn, Fe, Co, and Ni, R is at least one selected from the group consisting of Cu, Ti, V, Cr, Zr, Nb, Mo, Hf, Ta, and W, Q' is at least one selected from the group consisting of B, Si, O, Ti, V, Cr, Mn, Fe, Co, and Ni, and R' is at least one selected from the group consisting of Ti, V, Cr, Zr, Nb, Mo, Hf, Ta, and W.

By providing the specular layer, it becomes possible to extend the mean free path $\lambda+$ of the up-spin conduction electrons and, thus, to increase the difference between the mean free path $\lambda+$ of the up-spin conduction electrons and the mean free path $\lambda-$ of down-spin conduction electrons. Accordingly, the rate of change in resistance ($\Delta R/R$) and reproduction output can be increased.

The magnetic detecting element may further include a backed layer on the upper surface of the second free magnetic layer in at least the region opposing the multilayer laminate in the thickness direction. Preferably, the backed layer is formed of an element selected from the group consisting of Cu, Au, Cr, and Ru. By providing the backed layer, a large rate of change in resistance can be obtained in the magnetic element by a so-called spin filter effect. Thus, the magnetic detecting element is adapted to high density recording.

The magnetic detecting element may further include a third antiferromagnetic layer above the second free magnetic layer in the region opposing the second antiferromagnetic layer in the thickness direction. Consequently, the magnetization of the second free magnetic layer in the end portions of the element can be surely fixed, and, thus, off-track characteristics can be enhanced and linearity can sufficiently be maintained. Thus, the magnetic detecting element has excellent reproduction characteristics. Also, even if the third antiferromagnetic layer has a smaller thickness than that of the second antiferromagnetic layer, which has been conventionally disposed on each end portion of the free magnetic layer, the magnetization of the second free magnetic layer in the end portions is surely fixed because the second antiferromagnetic layer is disposed at each side of the multilayer laminate. Thus, in the magnetic detecting element of the present invention, the height of the protuberances in the end portions of the element does not become large, and, consequently, the distance between the shield layers can be reduced.

Preferably, the magnetic detecting element includes a ferromagnetic layer between the third antiferromagnetic layer and the second free magnetic layer. Preferably, the magnetic detecting element includes a fourth antiferromagnetic layer between the third antiferromagnetic layer and the second free magnetic layer.

Preferably, the magnetic detecting element further includes a nonmagnetic layer in a space dividing the antiferromagnetic layer in the track width direction, above the second free magnetic layer. Preferably, the nonmagnetic layer is formed of at least one selected from the group consisting of Cu, Ru, Re, Pd, Os, Ir, Pt, Au, Rh, and Cr.

Preferably, the angle $\theta 1$ between the lower surface of the multilayer laminate and each side surface of the multilayer laminate is in the range of 60° to 90°. By setting the angle $\theta 1$ in this range, the thickness of the pointed portion of the second antiferromagnetic layer at the internal side can be increased. Consequently, an exchange coupling magnetic field having a suitable intensity can be generated between the pointed portion and the second free magnetic layer, thereby surely fixing the magnetization of the second free magnetic layer in the end portions, and particularly in the region close to the central portion.

The magnetic detecting element may include an electrode layer above the second free magnetic layer in the region opposing the second antiferromagnetic layer in the thickness direction. This is referred to as a current-in-plane (CIP) structure, in which sense current flows in the layers of the multilayer laminate in the direction parallel to the surface of the layers.

Alternatively, the magnetic detecting element may include an upper electrode above the multilayer laminate and a lower electrode under the multilayer laminate. This is referred to as a current-perpendicular-to-plane (CPP) structure, in which sense current flows in the layers of the multilayer laminate in the thickness direction.

In the CPP structure, preferably, the magnetic detecting element includes an insulating layer between the lower electrode layer and the second antiferromagnetic layer and between the second antiferromagnetic layer and each end surface of the multilayer laminate. Preferably, the magnetic detecting element includes an insulating layer between the upper electrode layer and the second free magnetic layer in the region opposing the second antiferromagnetic layer in the thickness direction, or between the upper electrode layer and the third antiferromagnetic layer. Thus, sense current is prevented from diverging into the second antiferromagnetic layer, and the resulting magnetic detecting element can exhibit large reproduction output.

According to another aspect of the present invention, a method for manufacturing a magnetic detecting element is provided. The method includes the steps of: (a) forming a multilayer laminate including a first antiferromagnetic layer, a pinned magnetic layer, a nonmagnetic material layer, and a first free magnetic layer in that order from the bottom thereof; (b) removing both sides of the multilayer laminate in the track width direction and providing a second antiferromagnetic layer on the end surfaces in the track width direction; and (c) providing a second free magnetic layer from the upper surface of the second antiferromagnetic layer to the upper surface of the first free magnetic layer.

This method facilitates the manufacture of a magnetic detecting element having the second antiferromagnetic layer at both sides of the multilayer laminate and the second free magnetic layer from the upper surface of the first free magnetic layer of the multilayer laminate to the upper surface of the second antiferromagnetic layer.

Preferably, step (a) includes the sub step of forming a nonmagnetic layer on the uppermost layer of the multilayer laminate, step (b) includes the sub step of forming a nonmagnetic layer on the second antiferromagnetic layer, and step (c) includes the sub step of removing part or the entirety of the nonmagnetic layers before forming the second free magnetic layer. The nonmagnetic layers serve to prevent an underlying layer thereof from oxidizing.

Preferably, step (a) includes the sub step forming a nonmagnetic layer on the uppermost layer of the multilayer laminate, step (b) includes the sub step of forming a ferromagnetic layer and a nonmagnetic layer on the second antiferromagnetic layer, and step (c) includes the sub step of partly or entirely removing the nonmagnetic layers before forming the second free magnetic layer. By continuously depositing the second antiferromagnetic layer and the ferromagnetic layer, an exchange coupling magnetic field having a suitable intensity can be generated between the second antiferromagnetic layer and the ferromagnetic layer. Also, by providing the nonmagnetic layer, an underlying layer thereof can be prevented from oxidizing.

Preferably, step (c) includes the sub step of forming a specular layer on the second free magnetic layer. Preferably, step (a) includes the sub step of oxidizing the nonmagnetic layer on the first free magnetic layer to a specular layer that will be left between the first free magnetic layer and the second free magnetic layer.

Preferably, the specular layer is formed of an oxide selected from the group consisting of Fe—O, Ni—O, Co—O, Co—Fe—O, Co—Fe—Ni—O, Al—O, Al-Q-O, and R—O; a nitride selected from the group consisting of Al—N, Al-Q'-N and R'—N; or a semimetallic whistler alloy, wherein Q is at least one selected from the group consisting of B, Si, N, Ti, V, Cr, Mn, Fe, Co, and Ni, R is at least one selected from the group consisting of Cu, Ti, V, Cr, Zr, Nb, Mo, Hf, Ta, and W, Q' is at least one selected from the group consisting of B, Si, O, Ti, V, Cr, Mn, Fe, Co, and Ni, and R' is at least one selected from the group consisting of Ti, V, Cr, Zr, Nb, Mo, Hf, Ta, and W.

Preferably, step (c) includes the sub step of forming a backed layer on the second free magnetic layer. Preferably, the backed layer is formed of an element selected from the group consisting of Cu, Au, Cr and Ru.

Step (c) may include the sub step of forming a third antiferromagnetic layer above the second free magnetic layer in the region opposing the second antiferromagnetic layer in the thickness direction.

In this instance, preferably, step (c) further includes the sub steps of: forming a nonmagnetic layer above the second free magnetic layer; and removing the nonmagnetic layer in the region opposing the second antiferromagnetic layer in the thickness direction, before the sub step of forming the third antiferromagnetic layer. The nonmagnetic layer serves as an antioxidant layer. However, if its initial thickness is maintained, an exchange coupling magnetic field having a suitable intensity cannot be generated between the third antiferromagnetic layer and the second free magnetic layer in the end portions of the element. This is the reason why the nonmagnetic layer in the end portions is removed before forming the third antiferromagnetic layer.

Preferably, step (c) further includes the sub step of: forming a ferromagnetic layer in the region from which the nonmagnetic layer has been removed, the sub step being performed before the sub step of forming the third antiferromagnetic layer. The third antiferromagnetic layer is disposed on the ferromagnetic layer. Thus, the intensity of the exchange coupling magnetic field between the third antiferromagnetic layer and the ferromagnetic layer is prevented from decreasing.

Step (c) may further include the sub step of forming a fourth antiferromagnetic layer on the second free magnetic layer, before the sub step of forming the third antiferromagnetic layer. The third antiferromagnetic layer is disposed above the fourth antiferromagnetic layer in the region opposing the second antiferromagnetic layer in the thickness direction.

Preferably, the nonmagnetic layer is formed of at least one selected from the group consisting of Cu, Ru, Re, Pd, Os, Ir, Pt, Au, Rh, and Cr, and the initial thickness of the nonmagnetic layer is in the range of 3 to 20 Å. By forming the nonmagnetic layer of Ru or the like, the resulting nonmagnetic layer can suitably serve as an antioxidant layer. In addition, since its thickness is small, a low-energy ion milling can be applied in the sub step of removing the nonmagnetic layer, so that the layer underlying the nonmagnetic layer is not negatively affected by the ion milling.

Step (c) may further include the sub step of forming an electrode layer above the second free magnetic layer in the region opposing the second antiferromagnetic layer in the thickness direction. Alternatively, step (a) may include the sub step of forming a lower electrode layer so as to extend in the track width direction beyond the width of the multilayer laminate, before forming the multilayer laminate, and an upper electrode layer is formed above the multilayer laminate after step (c).

In the case where the upper and lower electrode layers are provided, preferably, step (c) further include the sub step of forming an insulating layer from the upper surface of the lower electrode layer to each side surface of the multilayer laminate, before forming the second antiferromagnetic layer. Alternatively, when the first antiferromagnetic layer is left so as to extend in the track width direction to each lower side of the multilayer laminate, an insulating layer may be formed from the upper surface of the first antiferromagnetic layer to each end surfaces of the multilayer laminate.

Preferably, step (c) further includes the sub step of forming an insulating layer above the second free magnetic layer in the region opposing the second antiferromagnetic layer in the thickness direction, after forming the second free magnetic layer, and the upper electrode layer is disposed from the upper surface of the insulating layer to the region above the multilayer. Alternatively, step (c) further includes the sub step of forming an insulating layer on the third antiferromagnetic layer, and the upper electrode layer is disposed from the upper surface of insulating layer to the region above the multilayer laminate.

DESCRIPTION OF THE PREFERRED EMBODIMENTS

Figure 1:
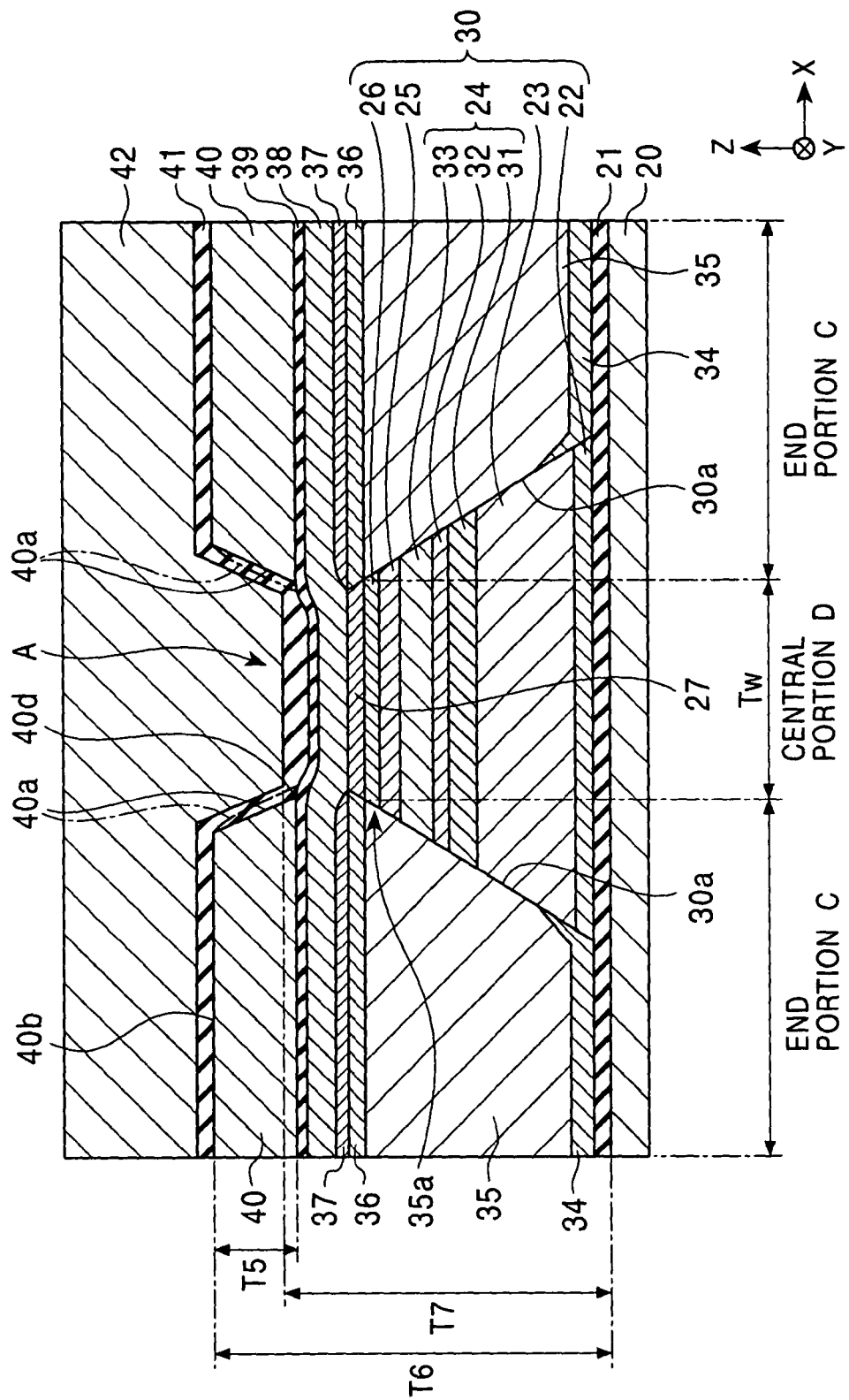
FIG. 1 is a fragmentary sectional view of a magnetic detecting element according to a first embodiment of the present invention, viewed from a side opposing a recording medium.

FIG. 1 is a fragmentary sectional view of a magnetic detecting element according to a first embodiment of the present invention, viewed from a side opposing a recording medium. The magnetic detecting element is a magnetoresistive (MR) head for reproducing the signal recorded in a recording medium. The MR head may have an inductive head for recording thereon. A face opposing a recording medium is perpendicular to the surfaces of the layers constituting the magnetic detecting element and parallel to the magnetization direction of a free magnetic layer of the magnetic detecting element when an external magnetic field (recording-signal magnetic field) is not applied. In FIG. 1, the face opposing a recording medium is parallel to the X-Z plane.

When the magnetic detecting element is used in a floating magnetic head, the face opposing a recording medium refers to a so-called ABS (Air Bearing Surface) face.

The magnetic detecting element is formed on the trailing end surface of a slider formed of, for example, alumina-titanium carbide ($Al_2O_3$—TiC). The slider is bonded with a flexible supporting member, and, thus, a magnetic head device is constituted.

The track width direction refers to a width direction of the region in which the magnetization direction is changed by an external magnetic field, and is, for example, the magnetization direction of the free magnetic layer when it is not subjected to an external magnetic field, that is, the X direction in the drawing. The width of the free magnetic layer in the track width direction defines the track width Tw of the magnetic detecting element.

A recording medium opposing the recording medium moves in the Z direction in the drawing. The leakage field from the recording medium is in the Y direction in the drawing.

As shown in FIG. 1, the magnetic detecting element includes a lower shield layer 20 and a lower gap layer 21 on the lower shield layer 20. The lower shield layer 20 is formed of a magnetic material such as a NiFe alloy. The lower gap layer 21 is formed of an insulating material such as $Al_2O_3$ or $SiO_2$.

As shown in FIG. 1, a seed layer 22, a first antiferromagnetic layer 23, a pinned magnetic layer 24, a nonmagnetic material layer 25, a first free magnetic layer 26, and a nonmagnetic layer 27 are layered in that order on the lower gap layer 21. The layers from the seed layer 22 to the nonmagnetic layer 27 constitute a multilayer laminate 30.

The seed layer 22 is formed of a NiFe alloy, a NiFeCr alloy, Cr, or the like. For example, the seed layer 22 is formed of $(Ni_{0.8}Fe_{0.2})_{60\ at\ \%}\ Cr_{40\ at\ \%}$ to a thickness of 60 Å.

The first antiferromagnetic layer 23 is formed of a PtMn alloy, an X—Mn alloy, or a Pt—Mn—X' alloy, wherein X is at least one element selected from the group consisting of Pd, Ir, Rh, Ru, Os, Ni, and Fe, and X' is at least one element selected from the group consisting of Pd, Ir, Rh, Ru, Au, Ag, Os, Cr, Ni, Ar, Ne, Xe, and Kr.

By using these alloys as the antiferromagnetic layer 23 and subjecting the alloys to heat treatment, the resulting first antiferromagnetic layer 23 and the pinned magnetic layer 24 can form an exchange coupling film generating an exchange coupling magnetic field having a high intensity. In particular, by using a PtMn alloy, the first antiferromagnetic layer 23 and the pinned magnetic layer 24 form an excellent exchange coupling film exhibiting an exchange coupling magnetic field of 48 kA/m or more, for example, more than 64 kA/m, and a extremely high blocking temperature of 380° C.

Although these alloys have a disordered face-centered cubic (fcc) structure immediately after being deposited, it modified into a CuAuI-type ordered face-centered tetragonal (fct) structure by heat treatment. The thickness of the first antiferromagnetic layer 23 is set in the range of 80 to 300 Å.

The pinned magnetic layer 24 has an artificial ferrimagnetic structure. The pinned magnetic layer 24 has a three-layer structure consisting of magnetic layers 31 and 33 and a nonmagnetic interlayer 32 between the magnetic layers 31 and 33.

The magnetic layers 31 and 33 are formed of a magnetic material, such as a NiFe alloy, Co, a CoNiFe alloy, a CoFe alloy, or a CoNi alloy. Preferably, the magnetic layers 31 and 33 are formed of the same material.

The nonmagnetic interlayer 32 is formed of a nonmagnetic material, such as an element or an alloy containing at least one selected from the group consisting of Ru, Rh, Ir, Cr, Re, and Cu. Ru is particularly preferable.

The magnetic layers 31 and 33 are each formed to a thickness in the range of about 10 to 70 Å. The thickness of the nonmagnetic interlayer 32 is in the range of about 3 to 10 Å.

The pinned magnetic layer 24 may have a single-layer structure formed of any one of the magnetic materials described above or a two-layer structure consisting of a layer formed of any one of the magnetic materials and a diffusion-preventing layer, such as a Co layer.

The nonmagnetic material layer 25 prevents the magnetic coupling of the pinned magnetic layer 24 with the first free magnetic layer 26 and through which sense current mainly flows. Preferably, the nonmagnetic material layer 25 is formed of a conductive nonmagnetic material, such as Cu, Cr, Au, or Ag. Cu is particularly preferable. The nonmagnetic material layer 25 is formed to a thickness, for example in the range of about 18 to 30 Å.

In the embodiment shown in FIG. 1, the first free magnetic layer 26 has a single layer structure. The first free magnetic layer 26 is formed of a NiFe alloy or the like. The free magnetic layer 26 may have, for example, a two-layer structure. In this instance, it is preferable that the free magnetic layer 26 is composed of a diffusion-preventing layer for preventing interdiffusion with the nonmagnetic material layer 25 formed of Co, CoFe, or the like and a magnetic material layer formed of a NiFe alloy or the like on the interdiffusion layer. The thickness of the first free magnetic layer 26 is in the range of about 20 to 50 Å.

Preferably, the nonmagnetic layer 27 is formed of at least one selected from the group consisting of Cu, Ru, Re, Pd, Os, Ir, Pt, Au, Rh, and Cr. Among these materials, Cu is particularly preferable. The thickness of the nonmagnetic layer 27 is, for example, in the range of 6 to 11 Å. By setting the thickness to this extent, an exchange coupling occurs by RKKY interaction between the first free magnetic layer 26 and a second free magnetic layer, described later, and the magnetizations of the first free magnetic layer 26 and the second free magnetic layer are oriented antiparallel to each other in the track width direction.

If the nonmagnetic layer 27 is formed of Ru and the thickness of the first free magnetic layer 26 is small, the magnetoresistive (MR) effect is degraded. In this instance, preferably, a specular layer, described later, is provided under the nonmagnetic layer 27.

On the other hand, if the thickness of the nonmagnetic material layer 27 is smaller than 6 Å, the magnetizations of the first free magnetic layer 26 and the second free magnetic layer are oriented to the same direction in the track width direction (X direction). The nonmagnetic layer 27 may not be formed in the first embodiment, shown in FIG. 1.

In the first embodiment, both end surfaces of the multilayer laminate 30 incline or bend such that the width of the multilayer laminate 30 in the track width direction (X direction) gradually decreases from the bottom to the top thereof in the Z direction.

As shown in FIG. 1, a seed layer 34 is formed from the upper surface of the lower gap layer 21, which extends in the track width direction (X direction) beyond the width of the multilayer laminate 30 in the track width direction, to part of each end surface 30a of the multilayer laminate 30. Also, a second antiferromagnetic layer 35 is formed from the upper surface of the seed layer 34 to each end surface 30a of the multilayer laminate 30, and a ferromagnetic layer 36 and a nonmagnetic layer 37 are further formed on the second antiferromagnetic layer 35.

The seed layer 34 is formed of the same material as in the foregoing seed layer 22. The second antiferromagnetic layer 35 is formed of a PtMn alloy, an X—Mn alloy, or a Pt—Mn—X' alloy, as with the first antiferromagnetic layer 23, wherein X is at least one element selected from the group consisting of Pd, Ir, Rh, Ru, Os, Ni, and Fe, and X' is at least one element selected from the group consisting of Pd, Ir, Rh, Ru, Au, Ag, Os, Cr, Ni, Ar, Ne, Xe, and Kr.

The ferromagnetic layers 36 is formed of a magnetic material, such as a NiFe alloy, a CoFe alloy, a CoFeNi alloy, or Co. Preferably, the nonmagnetic layer is formed of at least one selected from the group consisting of Cu, Ru, Re, Pd, Os, Ir, Pt, Au, Rh, and Cr.

In the first embodiment, a second free magnetic layer 38 is formed from the upper surface of the nonmagnetic layer 27, which is the uppermost layer of the multilayer laminate 30, to the upper surface of the nonmagnetic layer 37 spreading over both sides in the track width direction. The second free magnetic layer 38 is formed of a NiFe alloy or the like, as with the first free magnetic layer 26. The second free magnetic layer 38 has a single-layer structure. However, it may have a layered structure including two or more layers.

In the first embodiment, a cap layer 39 is formed on the second free magnetic layer 38. The cap layer 39 serves as an antioxidant layer for preventing the second free magnetic layer 38 from oxidizing. The cap layer 39 may also be used as a specular layer or a backed layer, as described later.

An electrode layer 40 is formed on the cap layer 39 in each end portion C of the element in the track width direction (X direction). The electrode layer 40 is formed of, for example, Au, W, Cr, Ru, Rh, or Ta.

An upper gap layer 41 is formed from the upper surface of the electrode layer 40 to the upper surface of the cap layer 39 exposed in a space A dividing the electrode layer 40 in the track width direction, and, further, an upper shield layer 42 is formed on the upper gap layer 41. The upper gap layer 41 is formed of an insulating material, such as $Al_2O_3$ or $SiO_2$, and the upper shield layer 42 is formed of a magnetic material, such as a NiFe alloy.

Characterized portions of the magnetic detecting element according to the first embodiment will now be described. Both end surfaces 30a of the multilayer laminate 30 incline or bend such that the width of the multilayer laminate 30 in the track width direction (X direction) gradually decreases from the bottom to the top thereof (in the Z direction), and the second antiferromagnetic layer 35 is disposed at both sides of the multilayer laminate 30 in the track width direction.

The second antiferromagnetic layer 35 and the ferromagnetic layer 36 generate an exchange coupling magnetic field therebetween, thereby fixing the magnetization of the ferromagnetic layer 36 in the X direction. As a result, the magnetization of the second free magnetic layer 38 in the end portions C, which opposes the ferromagnetic layer 36 with the nonmagnetic layer 37 therebetween, is fixed in the direction opposite to the X direction by exchange coupling provided by an RKKY interaction with the ferromagnetic layer 36.

The second free magnetic layer 38 in the central portion D of the element is magnetized in the direction opposite to the X direction by a bias magnetic field by exchange interaction from the second free magnetic layer 38 in the end portions C. Since this second free magnetic layer 38 does not undergo a strong exchange coupling magnetic field from the second antiferromagnetic layer 35, it is put into a single magnetic domain state to such a small extent that the magnetization thereof is reversible in response to an external magnetic field. Also, the first free magnetic layer 26, which opposes the second free magnetic layer 38 in the central portion D with the nonmagnetic layer 27 therebetween, is put into a single magnetic domain state in the X direction by an exchange coupling provided by RKKY interaction with the second free magnetic layer 38 in the central portion D. Thus, the first free magnetic layer 26 and the second free magnetic layer 38 in the central portion D are put into a single magnetic domain state to such a small extent that their magnetizations are reversible in response to an external magnetic field while their antiparallel magnetization directions maintained.

As described above, the first embodiment shown in FIG. 1, the second antiferromagnetic layer 35 is disposed at both sides of the multilayer laminate 30, and the second free magnetic layer 38 is extended in the track width direction beyond the width of the multilayer laminate 30 so that the magnetization of the second free magnetic layer 38 in the end portions C is fixed. Thus, the second free magnetic layer 38 in the central portion D is put into a single magnetic domain state to such a small extent that the magnetization is reversible in response to an external magnetic field.

Thus, the magnetizations of the second free magnetic layer 38 and the first free magnetic layer 26 can suitably be controlled. Also, since the second free magnetic layer 38 in the end portions C is provided with only the electrode layer 40 thereon, as shown in FIG. 1, the thickness rising above the second free magnetic layer 38 in the end portions C is only the thickness T5 of the electrode layer 40, thus decreasing in comparison with the known element.

As a result, the shield distance between the lower shield layer 20 and the upper shield layer 42 in the end portions C becomes T6 and close to the shield distance T7 in the central portion D. Accordingly, the increase of the effective reproduction track width and PW50 can be suppressed effectively. Also, since the step height between the upper surface of the electrode layer 40 and the cap layer 39 exposed in the space A is reduced, the upper gap layer 41 can easily be deposited at a predetermined thickness on the inner side surfaces 40a of the electrode layer 40 and the corners 40d between the inner side surfaces 40a and the upper surface of the cap layer 39. Thus, the insulation between the upper shield layer 42 and the electrode layer 40 and between the upper shield layer 42 and the multilayer laminate 30 can be enhanced in comparison with the known element.

In the first embodiment shown in FIG. 1, the track width Tw is defined by the distance between the upper surfaces of the second antiferromagnetic layer 35 in the track width direction. Preferably, the track width Tw is in the range of about 0.1 to 0.2 μm. The track width Tw is set according to the recording format, track density, track pitch of recording media. The track width Tw is based on measurement by scanning microscopy, and it is referred to as an optical track width O-Tw, in some cases. It is most preferable that this optical track width Tw is equivalent to the effective reproduction track width Mag-Tw, which is the actual track width contributing to magnetic reproduction. The effective reproduction track width may be measured by a known method, such as a full-track profile method or a micro-track profile method.

As described above, in the first embodiment, the increase of the effective reproduction track width Mag-Tw in the track width direction (X direction) can be suppressed in comparison with the known element. Accordingly, in the magnetic detecting element of the first embodiment, the difference between the effective reproduction track width Mag-Tw and the optical track width O-Tw can be reduced effectively. Thus, the magnetic detecting element can be adapted to the demand for a narrow track.

In the first embodiment, the first free magnetic layer 26 in the multilayer laminate 30 is necessary. If the first free magnetic layer 26 is not present, the upper surface of the nonmagnetic material layer 25 is affected by ion milling or the nonmagnetic layer 27 is left on the nonmagnetic material layer 25 in the manufacturing method described later. As a result, spin-dependent electron scattering does not occur effectively in the interface between the nonmagnetic material layer 25 and the free magnetic layer, and, thus reproduction characteristics are disadvantageously degraded. However, in the case of a CPP-GMR element or the like using spin-dependent bulk scattering, the first free magnetic layer 26 may not be present.

In the CIP-GMR element according to the first embodiment, the first free magnetic layer 26 must be formed in the multilayer laminate 30.

In the first embodiment, the nonmagnetic layer 27 is disposed on the first free magnetic layer 26. This nonmagnetic layer 27 may not be formed. However, since the nonmagnetic layer 27 serves as an antioxidant layer for preventing the upper surface of the first free magnetic layer 26 from oxidizing in the manufacturing process of the magnetic detecting element, the nonmagnetic layer 27 is formed to a larger thickness than the thickness shown in FIG. 1 when it is deposited.

Also, the nonmagnetic layer 37 is provided on the ferromagnetic layer 36 formed at both sides of the multilayer laminate 30. In the embodiment shown in FIG. 1, both the first free magnetic layer 26 and the ferromagnetic layer 36 are provided with the nonmagnetic layer 27 or 37 thereon. However, only either of them may be provided with a nonmagnetic layer.

As described above, when the thickness of the nonmagnetic layers is in the range of 6 to 11 Å, RKKY interaction occurs between the ferromagnetic layers opposing each other with the nonmagnetic layer therebetween, and, thus, the magnetizations of the ferromagnetic layers are antiparallel to each other. On the other hand, when the thickness of the nonmagnetic layer is reduced to less than 6 Å, the ferromagnetic layers are magnetized in the same direction. For example, when the thickness of the nonmagnetic layer 37 on the ferromagnetic layer 36 is 6 to 11 Å and the thickness of the nonmagnetic layer 27 on the first free magnetic layer 26 is 6 Å or less, the magnetizations of the ferromagnetic layer 36 and the second free magnetic layer 38 are antiparallel to each other due to an exchange coupling provided by RKKY interaction between the ferromagnetic layer 36 and the free magnetic layer 38 in the end portions C. On the other hand, the second free magnetic layer 38 and the first free magnetic layer 26 in the central portion D are magnetized in the same direction.

In the first embodiment shown in FIG. 1, a cap layer 39 is formed on the second free magnetic layer 38, and the cap layer 39 can serve as a specular layer.

By providing the specular layer, conduction electrons (for example, up-spin conduction electrons) reaching the specular layer is subjected to spectacular reflection while maintaining their spin states (energy and quantum states). Then, the specular-reflected up-spin conduction electrons change their traveling direction, and pass through the second free magnetic layer 38 and the first free magnetic layer 26.

Hence, it becomes possible to extend the mean free path λ+ of the up-spin conduction electrons by providing the specular layer and, thus, to increase the difference between the mean free path λ+ of the up-spin conduction electrons and the mean free path λ− of down-spin conduction electrons. Accordingly, the rate of change in resistance (ΔR/R) and the reproduction output can be increased.

Exemplary materials of the specular layer include oxides, such as Fe—O, Ni—O, Co—O, Co—Fe—O, Co—Fe—Ni—O, Al—O, Al-Q-O, and R—O; nitrides, such as Al—N, Al-Q'-N, and R—N'; and semimetallic whistler alloys, wherein Q is at least one selected from the group consisting of B, Si, N, Ti, V, Cr, Mn, Fe, Co, and Ni, R is at least one selected from the group consisting of Cu, Ti, V, Cr, Zr, Nb, Mo, Hf, Ta, and W, Q' is at least one selected from the group consisting of B, Si, O, Ti, V, Cr, Mn, Fe, Co, and Ni, and R' is at least one selected from the group consisting of Ti, V, Cr, Zr, Nb, Mo, Hf, Ta, and W.

However, if a specular layer formed of an oxide insulates the electrode layer 40 and the second free magnetic layer 38 from each other, sense current does not flow adequately into the multilayer laminate 3. In such a case, it is preferable not to provide the specular layer under the electrode layer 40.

The cap layer 39 may be a backed layer. The backed layer is formed of, for example, Cu, Au, Cr, or Ru. By providing the backed layer, the mean free path of up-spin conduction electrons contributing to the magnetoresistance effect is extended, and, thus, a large rate of change in resistance can be obtained in a magnetic element by a so-called spin filter effect. Thus, the magnetic element is adapted to high density recording.

The cap layer 39 may have a layered structure including the backed layer and the specular layer.

According to the manufacturing method described later, the cap layer 39, which may include either the specular layer or the backed layer or both of them, can easily and appropriately be formed on the second free magnetic layer 38.

The nonmagnetic layer 27 between the first free magnetic layer 26 and the second free magnetic layer 38 may also be a specular layer. In this instance, after the nonmagnetic layer 27 is formed of a nonmagnetic material, it is oxidized to a specular layer.

Preferably, the angle θ1 between the lower surface of the multilayer laminate 30 and each side surface 30a of the multilayer laminate is in the range of 60° to 90°. By setting the angle θ1 at 60° or more, the acute angle of the pointed portion 35a of the internal upside of the second antiferromagnetic layer 35 can be alleviated and, thus, the thickness of the pointed portion 35a can be increased. Consequently, the intensity of the exchange coupling magnetic field generated between the pointed portion 35a of the second antiferromagnetic layer 35 and the ferromagnetic layer 36 increases, and the magnetization of the ferromagnetic layer 36 in the vicinity of the central portion D can adequately be fixed. As a result, the magnetization of the second free magnetic layer 38 in the end portions C can surely be fixed even in the vicinity of the element central portion D. Accordingly, off-track characteristics can be enhanced in comparison with the known element and linearity can sufficiently be maintained. Thus, the resulting magnetic detecting element has excellent reproduction characteristics.

In the first embodiment shown in FIG. 1, the seed layer 34 is formed under the second antiferromagnetic layer 35. By providing the seed layer 34, it is expected that the reliability of communication as typified by an enhanced electro-migration resistance and ESD resistance is improved.

In the first embodiment, the distance in the space A between the lower surfaces of the electrode layer 40 is equivalent to the track width Tw. However, the inner ends 40a of the electrode layer 40 may be extended into the region defined by the track width Tw, as shown by dotted-chain line, and, thus, the distance between the lower surfaces of the electrode layer 40 may be set smaller than the track width Tw. Consequently, it is ensured that the flow of sense current from the electrode layer 40 to the multilayer laminate 30 is limited to in the region defined by the tack width Tw, thus enhancing reproduction output and reducing side reading.

Figure 2:
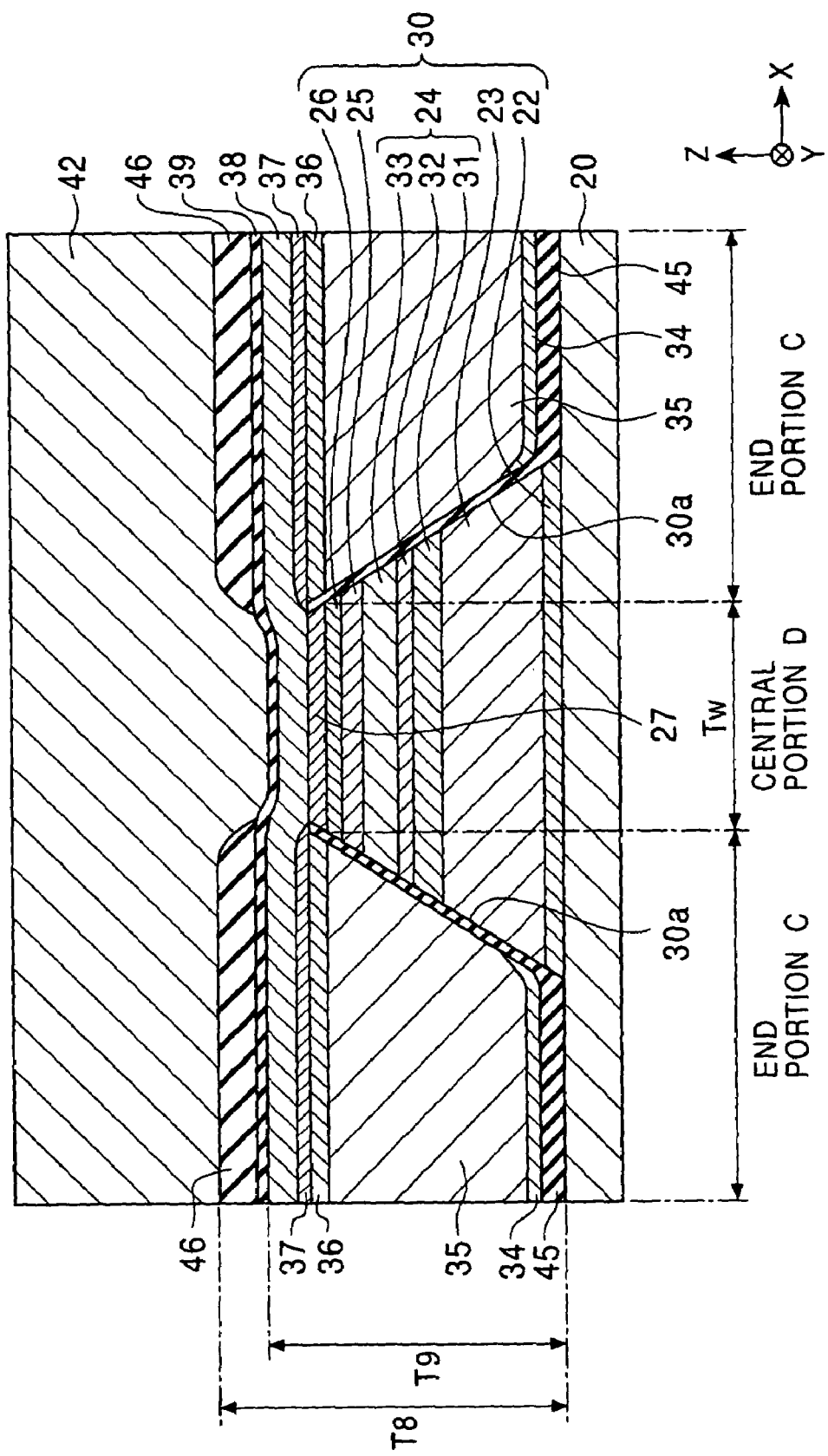
FIG. 2 is a fragmentary sectional view of a magnetic detecting element according to a second embodiment of the present invention, viewed from a side opposing a recording medium.

FIG. 2 is a fragmentary sectional view of a magnetic detecting element according to a second embodiment of the present invention, viewed from a side opposing a recording medium.

The magnetic detecting element shown in FIG. 1 has a CIP structure in which the electrode layer 40 is formed at each side of the multilayer laminate 30 in the track width direction (X direction) and sense current flows in the layers of the multilayer laminate 30 in the direction parallel to the surface of the layers. On the other hand, the magnetic detecting element shown in FIG. 2 has a CPP (current perpendicular to the plane) in which the shield layers 20 and 42 doubling as electrodes opposes each other in the thickness direction of the multilayer laminate 30 and a sense current flows in the layers of the multilayer laminate 30 in the thickness direction.

In FIG. 2, the same reference numerals as in FIG. 1 designate the same layers as in FIG. 1.

In the magnetic detecting element shown in FIG. 2, an insulating layer 45 is formed from each upper surface of the lower shield layer 20, which extends in the track width direction (X direction) beyond the width of the multilayer laminate 30, to each end surface 30a of the multilayer laminate 30. Preferably, the insulating layer 45 is formed of an insulating material, such as $Al_2O_3$ or $SiO_2$. The insulating layer 45 may serve as the above-described specular layer, which is intended to prevent MR characteristics from being negatively affected by the diffusion and scattering of conduction electrons at both end surfaces 30a of the multilayer laminate 30.

In the second embodiment shown in FIG. 2, the insulating layer 45 ensures the insulation between each end surface 30a of the multilayer laminate 30 and the upper surface of the lower shield layer 20 extending beyond the width of the multilayer laminate 30. As shown in FIG. 2, the seed layer 34 is formed on the insulating layer 45, and the second antiferromagnetic layer 35 is formed on the seed layer 34.

Also, an insulating layer 46 is formed above the second free magnetic layer 38, in each end portion C of the element, with the cap layer 39 therebetween. The shield layer 42 is formed from the upper surface of the insulating layer 46 to the upper surface of the cap layer 39. The insulating layer 46 is formed of an insulating material, such as $Al_2O_3$ or $SiO_2$, as with the insulating layer 45.

By providing the insulating layer 46, the upper surface of the second free magnetic layer 38 is surely insulated in the end portions C.

In the CPP magnetic detecting element shown in FIG. 2, by insulating the end portions C of the magnetic detecting element from the shield layers 20 and 42 with the insulating layers 45 and 46, the flow of sense current from the shield layers 20 and 42 to the magnetic detecting element is limited to in the multilayer laminate 30. Thus, diversion loss of the sense current can suitably be suppressed. Accordingly, the magnetic detecting element can exhibit a large reproduction output. Only either of the insulating layers 45 and 46 may be provided.

Figure 21:
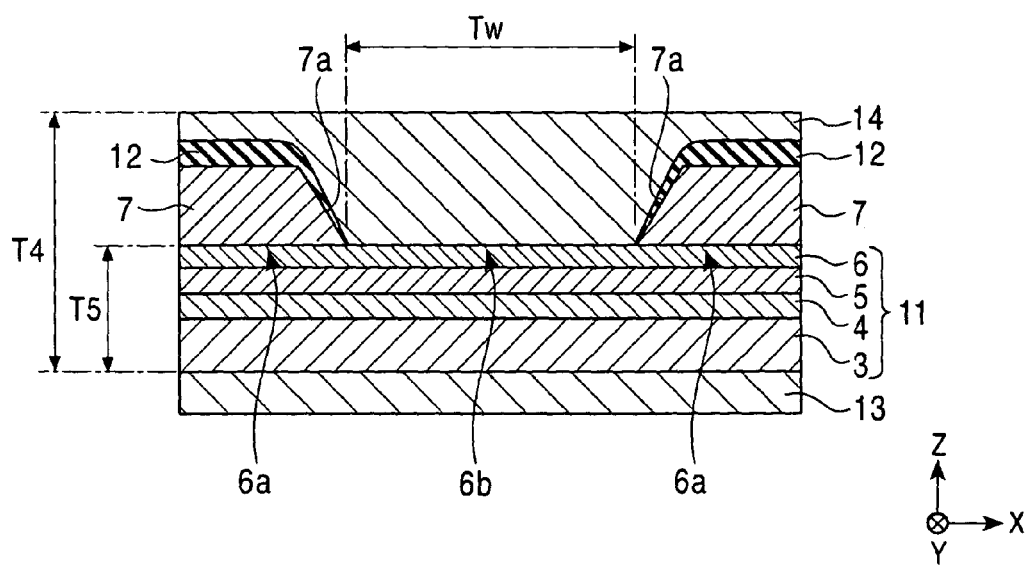
FIG. 21 is a fragmentary sectional view of another known magnetic detecting element, viewed from a side opposing a recording medium.

In the second embodiment, the second antiferromagnetic layer 35 is provided at each side of the multilayer laminate 30 in the track width direction (X direction), and the second free magnetic layer 38 is provided with only the insulating layer 46 thereon in the end portions C. Therefore, the height of the protuberances in both end portions C can be reduced in comparison with the known element. Consequently, the shield distance TB between the lower shield layer 20 and the upper shield layer 42 in the end portions C becomes close to the shield distance T9 in the element central portion D. Accordingly, the increases of the effective reproduction track width and PW50 can be suppressed effectively. Also, since the insulating layer 46 is formed above the substantially flat second free magnetic layer 38 with the cap layer 39 therebetween, the magnetic detecting element in the end portions C can surely be insulated by the insulating layer 46 in comparison with the known element shown in FIG. 21, in which the insulating layer 12 is necessarily formed on the antiferromagnetic layer 7.

Figure 3:
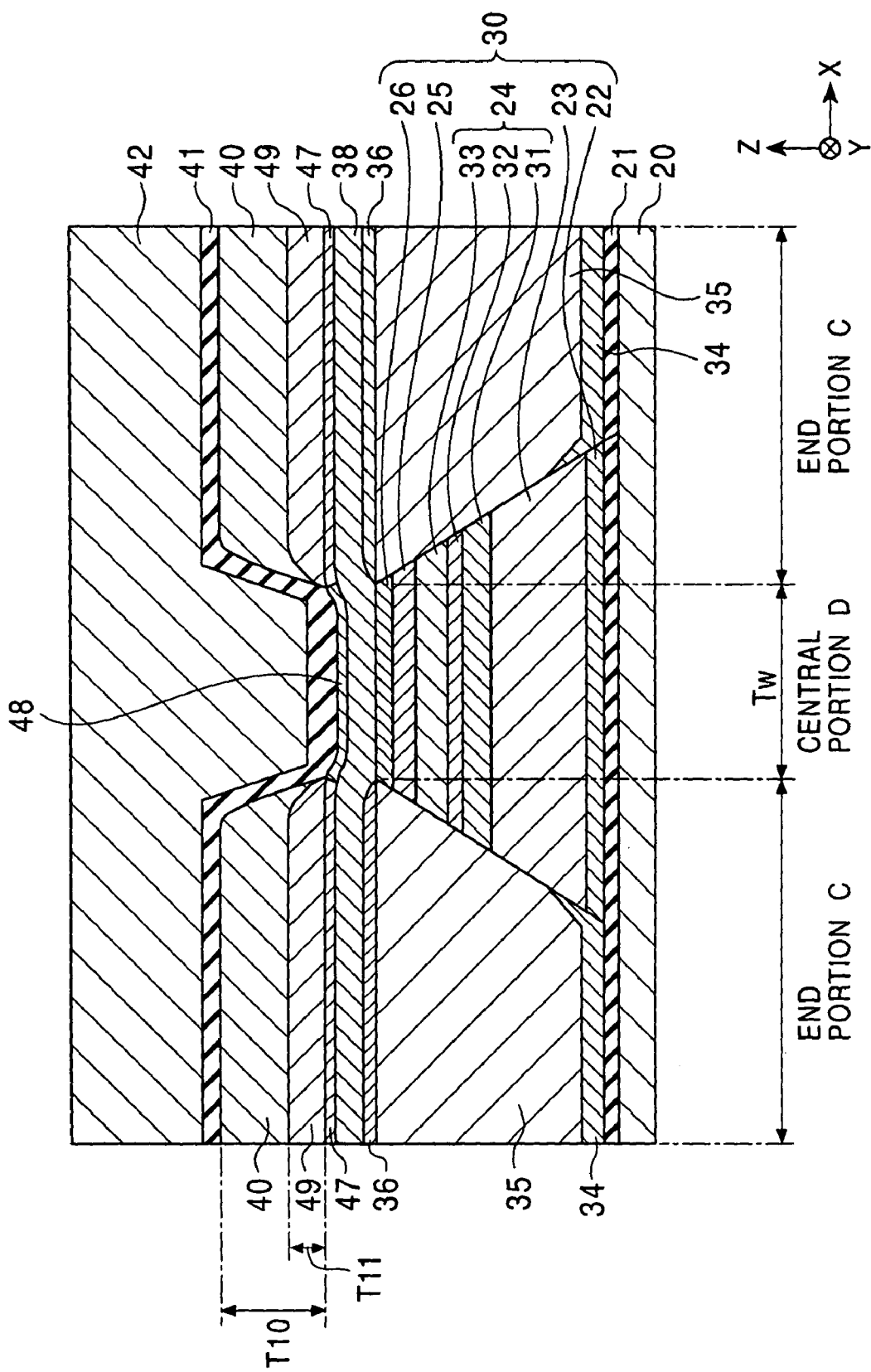
FIG. 3 is a fragmentary sectional view of a magnetic detecting element according to a third embodiment of the present invention, viewed from a side opposing a recording medium.

FIG. 3 is a fragmentary sectional view of a magnetic detecting element according to a third embodiment of the present invention, viewed from a side opposing a recording medium. The same reference numerals as in FIG. 1 designate the same layers as in FIG. 1.

A magnetic detecting element shown in FIG. 3 is different from that in FIG. 1. Specifically, a ferromagnetic layer 47, a third antiferromagnetic layer 49, and the electrode layer 40 are formed on the second free magnetic layer 38 in the end portions of the element, in that order. Also, in the central portion D of the element, a nonmagnetic layer 48 is formed on the second free magnetic layer 38, as shown in FIG. 3.

In the third embodiment shown in FIG. 3, since the third antiferromagnetic layer 49 and the electrode layer 40 are provided on the second free magnetic layer 38 in the end portions C, the thickness of the protuberances in the end portions C is defined as T10. This thickness becomes larger than that in FIG. 1, in which only the electrode layer 40 is provided on the second free magnetic layer 38 in the end portions C.

Figure 20:
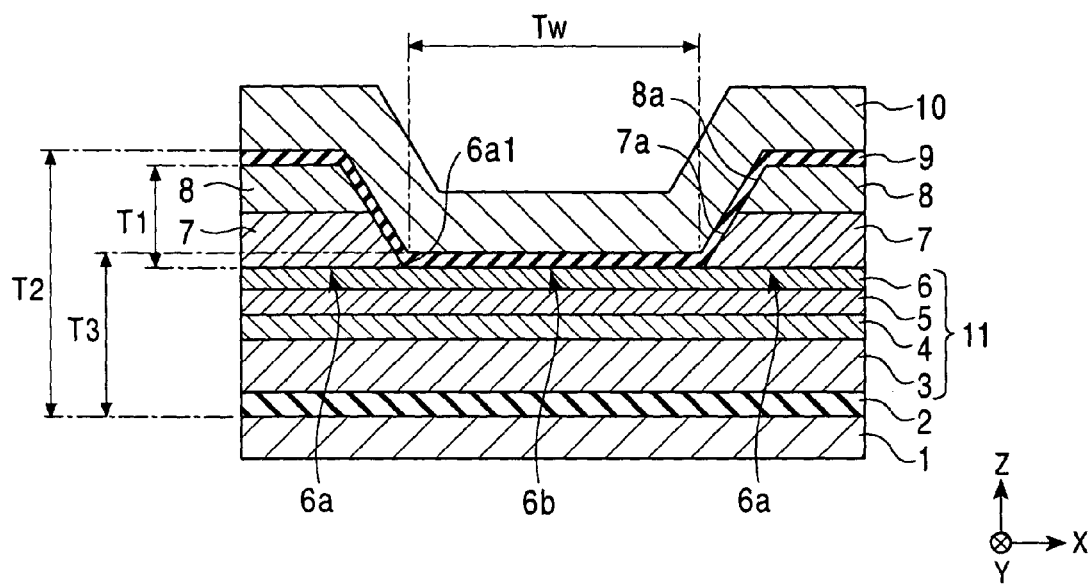
FIG. 20 is a fragmentary sectional view of a known magnetic detecting element, viewed from a side opposing a recording medium.

In the third embodiment, however, the third antiferromagnetic layer 49 serves as an adjunctive layer to surely fix the magnetization of the second free magnetic layer 38 in the end portions C because the second antiferromagnetic layer 35 is provided under the second free magnetic layer 38 in the end portions C and the magnetization of the second free magnetic layer 38 in the end portions C is fixed by exchange interaction with the ferromagnetic layer 36 whose magnetization is fixed in the X direction by an exchange coupling magnetic field generated between the second antiferromagnetic layer 35 and second free magnetic layer 38. Therefore, the thickness of the third antiferromagnetic layer 49 can be reduced in comparison with that of the second antiferromagnetic layer 7 of the known element, shown in FIG. 20.

Preferably, the thickness T11 of the third antiferromagnetic layer 49 shown in FIG. 3 is in the range of 50 to 150 Å. If the thickness T11 of the third antiferromagnetic layer 49 is 50 Å or less, the exchange coupling magnetic field generated between the third antiferromagnetic layer 49 and the ferromagnetic layer 47 becomes excessively small, or it is not generated. The magnetization of the ferromagnetic layer 47 is, therefore, not suitably fixed in the X direction, and, thus, the exchange interaction between the second free magnetic layer 38 and the ferromagnetic layer 47 in the end portions C becomes very weak. Consequently, the third antiferromagnetic layer 49 cannot serve as an adjunctive bias layer for surely fixing the magnetization of the second free magnetic layer 38 in the end portions C. Preferably, the exchange coupling magnetic field generated between the third antiferromagnetic layer 49 and the ferromagnetic layer 47 is 8 kA/m or more.

If the thickness T11 of the third antiferromagnetic layer 49 is 150 Å or more, the thickness T10 of the protuberance in the end portions C increases as large as that of the known element. Consequently, the effective reproduction track width is undesirably increased and the insulation properties are degraded.

In the third embodiment shown in FIG. 3, since a bias magnetic field is applied from above and below the second free magnetic layer 38, the magnetization of the second free magnetic layer 38 is surely fixed in the end portions C, and particularly in the vicinity of the central portion D. Thus, the magnetic detecting element can exhibit more excellent reproduction characteristics, and in which, for example, the off-track characteristics can further be enhanced and a satisfactory linearity can be ensured.

In the third embodiment, the nonmagnetic layer 48 is provided on the second free magnetic layer 38 in the central portion D. Preferably, this nonmagnetic layer 48 is formed of at least one material selected from the group consisting of Cu, Ru, Re, Pd, Os, Ir, Pt, Au, Rh, and Cr. The nonmagnetic layer 48 serves as an antioxidant layer for preventing the second free magnetic layer 38 from oxidizing, as described in detail later.

Although, in the end portions C, the nonmagnetic layer 48 is not present between the second free magnetic layer 38 and the ferromagnetic layer 47, it may be provided there. In this instance, if the thickness of the nonmagnetic layer 48 is 6 to 11 Å, an exchange coupling occurs between both element end portions C of the second free magnetic layer 38 and the ferromagnetic layer 47 by RKKY interaction. Thus, in the end portions C, the second free magnetic layer 38 and the ferromagnetic layer 47 are magnetized in antiparallel with each other in the track width direction.

On the other hand, if the thickness of the nonmagnetic layer 48 is smaller than 6 Å, the magnetizations of the second free magnetic layer 38 and the ferromagnetic layer 47 are oriented to the same direction in the track width direction.

When, for example, the nonmagnetic layer 48 is provided between the ferromagnetic layer 47 and the second free magnetic layer 38 in the end portions C and the magnetizations of the ferromagnetic layer 47 and the second free magnetic layer 38 are antiparallel to each other, the nonmagnetic layer 37 shown in FIG. 1 may be provided between the ferromagnetic layer 36 and the second free magnetic layer 38 in the end portions C so that the magnetizations of the ferromagnetic layer 36 and the second free magnetic layer 38 become antiparallel to each other.

Figure 4:
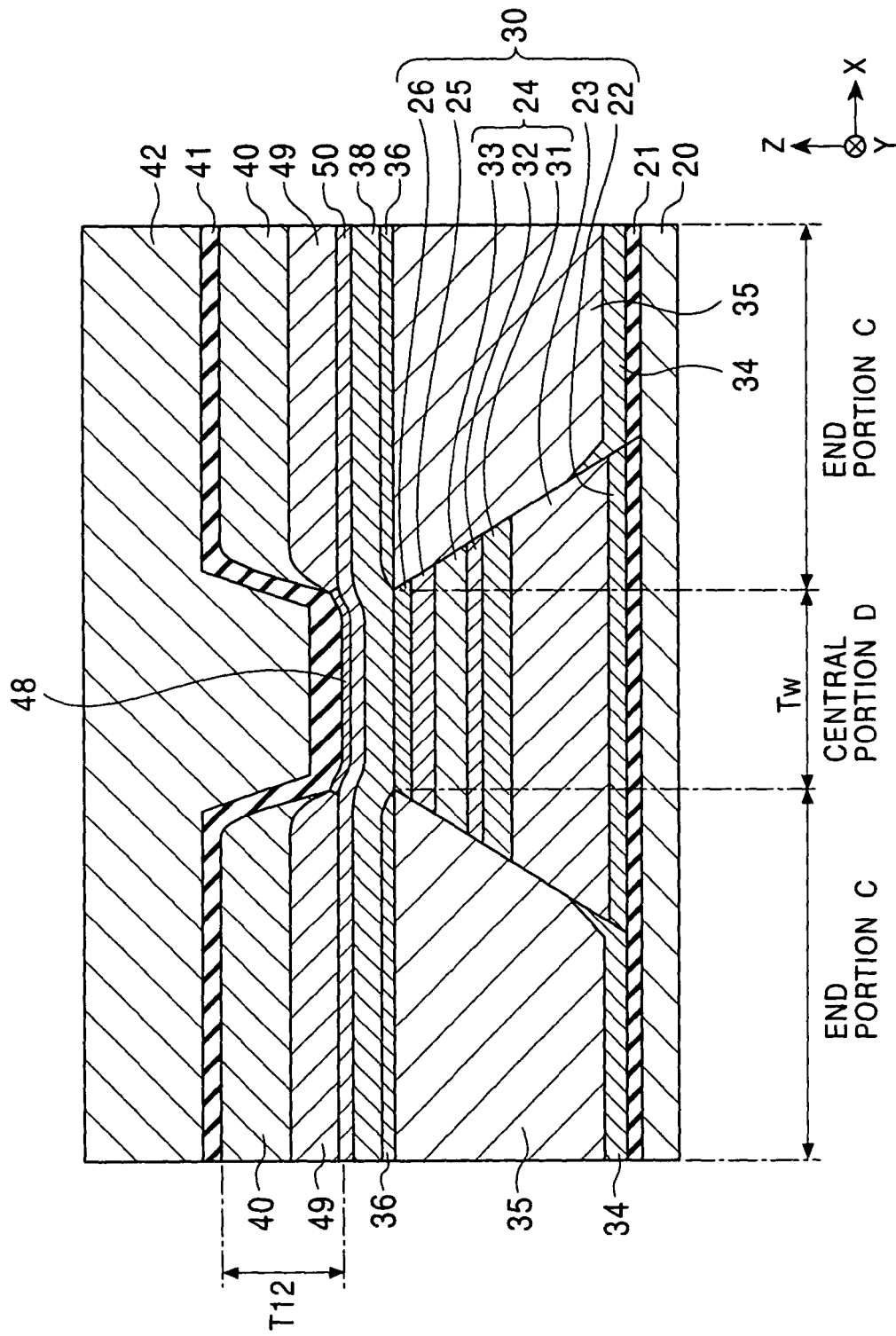
FIG. 4 is a fragmentary sectional view of a magnetic detecting element according to a fourth embodiment of the present invention, viewed from a side opposing a recording medium.

FIG. 4 is a fragmentary sectional view of a magnetic detecting element according to a fourth embodiment of the present invention, viewed from a side opposing a recording medium.

The magnetic detecting element shown in FIG. 4 is different from the element shown in FIG. 3. A fourth antiferromagnetic layer 50 is formed on the second free magnetic layer 38, and the third antiferromagnetic layer 49 and the electrode layer 40 are formed on the fourth antiferromagnetic layer 50 in each end portion C.

Preferably, the thickness of the fourth antiferromagnetic layer 50 is in the range of 20 to 50 Å. By forming the fourth antiferromagnetic layer 50 to a thickness as small as 50 Å or less, the fourth antiferromagnetic layer 50 does not exhibit antiferromagnetic characteristics when it is deposited. The fourth antiferromagnetic layer 50 is, therefore, difficult to modify for regularization even if it is subjected to annealing in a magnetic field. Consequently, since an exchange coupling magnetic field is not generated between the fourth antiferromagnetic layer 50 and the second free magnetic layer 38, or it is small if generated, the entire magnetization of the second free magnetic layer 38 is not fixed as firmly as that of the pinned magnetic layer 24.

On the other hand, if the thickness of the fourth antiferromagnetic layer 50 is less than 20 Å, the fourth antiferromagnetic layer 50 in the end portions C does not easily exhibit antiferromagnetic characteristics even if the third antiferromagnetic layer 49 is provided in the end portions C. Consequently, an exchange coupling magnetic field having a suitable intensity is not generated between the fourth antiferromagnetic layer 50 and the second free magnetic layer 38 in the end portions C. This is the reason why the thickness of the fourth antiferromagnetic layer 50 is set at 20 Å or more.

In the fourth embodiment shown in FIG. 4, also, the second free magnetic layer 38 in the end portions C is more surely magnetized in the X direction, by exchange interaction with the ferromagnetic layer 36 that is magnetized in the X direction by an exchange coupling magnetic field generated between the second antiferromagnetic layer 35 and the second free magnetic layer 38, and by an exchange coupling magnetic field generated between the fourth antiferromagnetic layer 50 and the second free magnetic layer in the end portions C. Thus, the magnetic detecting element can exhibit more excellent reproduction characteristics, and in which, for example, the off-track characteristics is further enhanced and a satisfactory linearity can be maintained.

In the fourth embodiment shown in FIG. 4, the thickness of the third antiferromagnetic layer 49, which is disposed above the second free magnetic layer 38 in each end portion C with the fourth antiferromagnetic layer 50 therebetween, is reduced effectively in comparison with the known element. This is because since the third antiferromagnetic layer 49 has the fourth antiferromagnetic layer 50 thereunder to form an integrated antiferromagnetic layer with the fourth antiferromagnetic layer 50, an suitable exchange coupling magnetic field can be generated between the fourth antiferromagnetic layer 50 and the second free magnetic layer 38 in the end portions C even if the thickness of the third antiferromagnetic layer 49 is small. Also, since the third antiferromagnetic layer 49 is an adjunctive layer for supporting the bias magnetic field from the second antiferromagnetic layer 35, which is disposed under the second free magnetic layer 38 in the end portions C, it can serve as an adjunctive bias layer if a certain degree of exchange coupling magnetic field is generated from the fourth antiferromagnetic layer 50 in the end portions C, which overlapped with the third antiferromagnetic layer 49. This is also the reason why the thickness of the third antiferromagnetic layer 49 can be reduced. Preferably, the thickness of the third antiferromagnetic layer 49 is set such that the total thickness, including the fourth antiferromagnetic layer 50 is in the range of 50 to 200 Å.

Since the thickness of the third antiferromagnetic layer 49 can be set smaller than that of the known element, the thickness T12 of the protuberances in the end portions C can be reduced in comparison with the known element. Accordingly, the increase of the effective reproduction track width and PW50 can be suppressed effectively. In addition, insulation can be adequately ensured between the upper shield layer 42 and the electrode layer 40. Thus, the magnetic detecting element can exhibit excellent reproduction characteristics.

Figure 5:
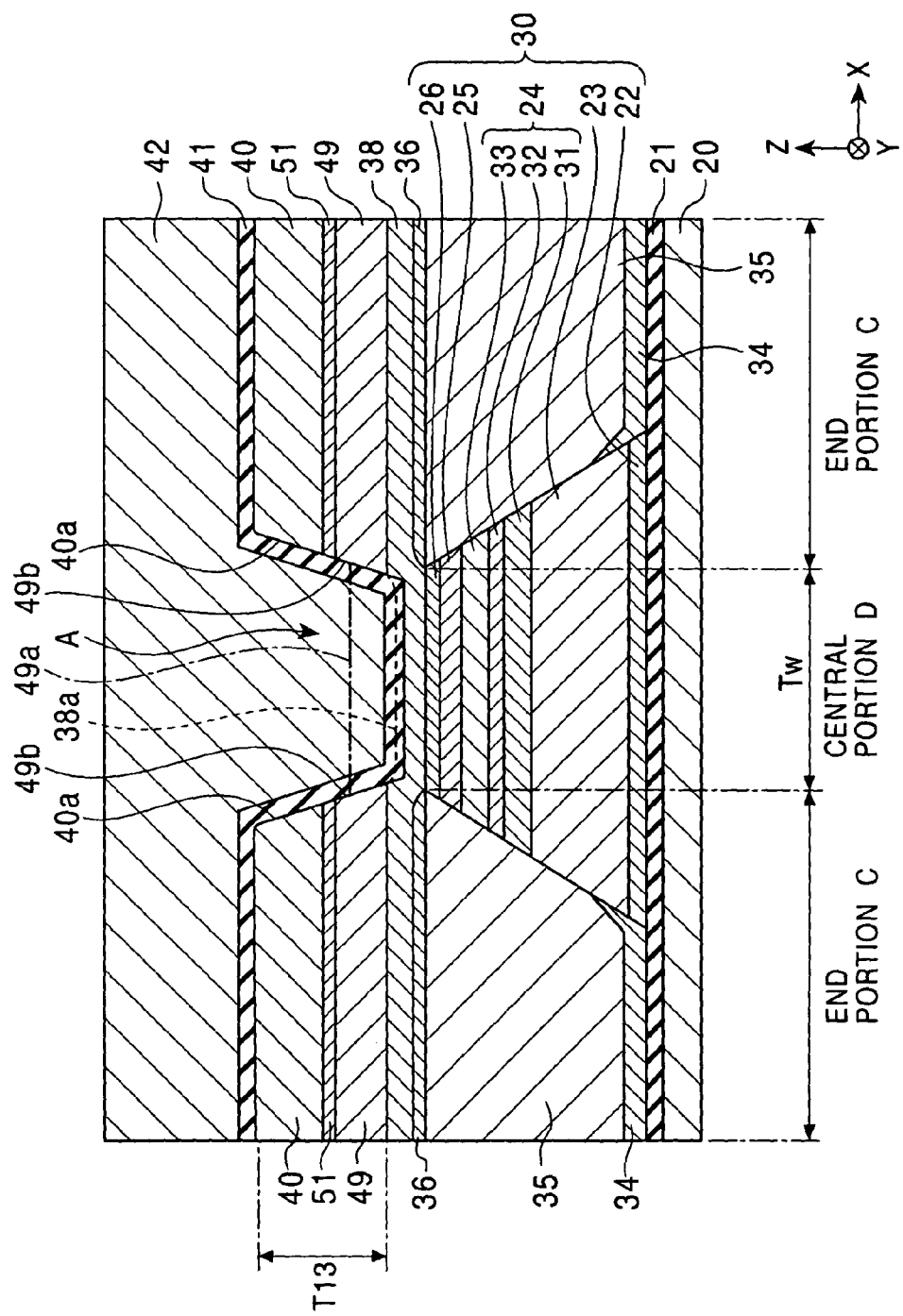
FIG. 5 is a fragmentary sectional view of a magnetic detecting element according to a fifth embodiment of the present invention, viewed from a side opposing a recording medium.

FIG. 5 is a fragmentary sectional view of a magnetic detecting element according to a fifth embodiment of the present invention, viewed from a side opposing a recording medium.

In the fifth embodiment shown in FIG. 5, the third antiferromagnetic layer 49 is disposed on the second free magnetic layer 38 in each end portion C of the element, and the electrode layer 40 is disposed above the third antiferromagnetic layer 49 with a nonmagnetic interlayer 51 formed of Ta, Cr, or the like therebetween.

Also, the surface of the second free magnetic layer 38 is cut away in the space A dividing the third antiferromagnetic layer 49 in the track width direction (X direction), so that the thickness of the second free magnetic layer 38 in the central portion D is smaller than that in the end portions C. However, the surface 38a of the second free magnetic layer 38 in the central portion D may not be cut away, as shown by a dotted line, so that the thickness of the second free magnetic layer 38 is uniform in both the element central portion D and the element end portions C.

Also, part of the third antiferromagnetic layer 49 may be left in the space A with a small thickness. The surface 49a of the remaining third antiferromagnetic layer 49 is designated by a dotted-chain line in FIG. 5. Preferably, the thickness of the remaining third antiferromagnetic layer 49 on the second free magnetic layer 38 in the central portion D is 50 Å or less. If the thickness is reduced to this extent, an exchange coupling magnetic field is not generated between the third antiferromagnetic layer 49 and the second free magnetic layer 38 in the central portion D, or it is small if generated. Accordingly, the magnetization of the second free magnetic layer 38 is not firmly fixed in the central portion D.

In the fifth embodiment shown in FIG. 5, the inner end surfaces 49b and 40a of the third antiferromagnetic layer 49 and the electrode layer 40 incline or bend such that the width of the space A in the track width direction gradually increases in the Z direction, from the bottom to the top thereof. However, the inner end surfaces 49b and 40a may be vertical, that is, parallel to the Z direction.

In also the embodiment shown in FIG. 5, the second free magnetic layer 38 in the element end portions C is more surely magnetized in the X direction, by exchange interaction with the ferromagnetic layer 36 that is magnetized in the X direction by an exchange coupling magnetic field generated between the second antiferromagnetic layer 35 and the second free magnetic layer 38, and by an exchange coupling magnetic field generated between the third antiferromagnetic layer 49 and the second free magnetic layer 38 in the end portions C. Thus, the magnetic detecting element can exhibit more excellent reproduction characteristics, and in which, for example, the off-track characteristics is further enhanced and a satisfactory linearity can be maintained.

In the fifth embodiment shown in FIG. 5, the thickness of the third antiferromagnetic layer 49, which is disposed on the second free magnetic layer 38 in the end portions C, is reduced more effectively in comparison with the known element. This is because, since the third antiferromagnetic layer 49 serves as an adjunctive bias layer, if this exchange coupling magnetic field has a certain degree of intensity, the magnetization of the second free magnetic layer 38 in end portions C can be fixed more effectively by the synergistic effect of the exchange coupling magnetic field generated between the third antiferromagnetic layer 49 and the second free magnetic layer 38 in the end portion C and the exchange interaction between the second free magnetic layer 38 and the ferromagnetic layer 36 in the end portions C.

As described above, since the thickness of the third antiferromagnetic layer 49 can be set smaller than that of the known element, the thickness T13 of the protuberance in the end portions C can be reduced in comparison with the known element. Accordingly, the increase of the effective reproduction track width and PW50 can be suppressed effectively. In addition, insulation can be adequately ensured between the upper shield layer 42 and the electrode layer 40. Thus, the magnetic detecting element can exhibit excellent reproduction characteristics.

Each of the magnetic detecting elements shown in FIGS. 3 to 5 has a CIP structure in which the electrode layer 40 is provided at each upper side of the multilayer laminate 30 in the track width direction and the sense current from the electrode layer 40 flows in the layers of the multilayer laminate 30 in the direction parallel to the surfaces of the layers. On the other hand, in magnetic detecting elements shown in FIGS. 6 to 8, the CIP structure is replaced with a CPP structure.

Figure 6:
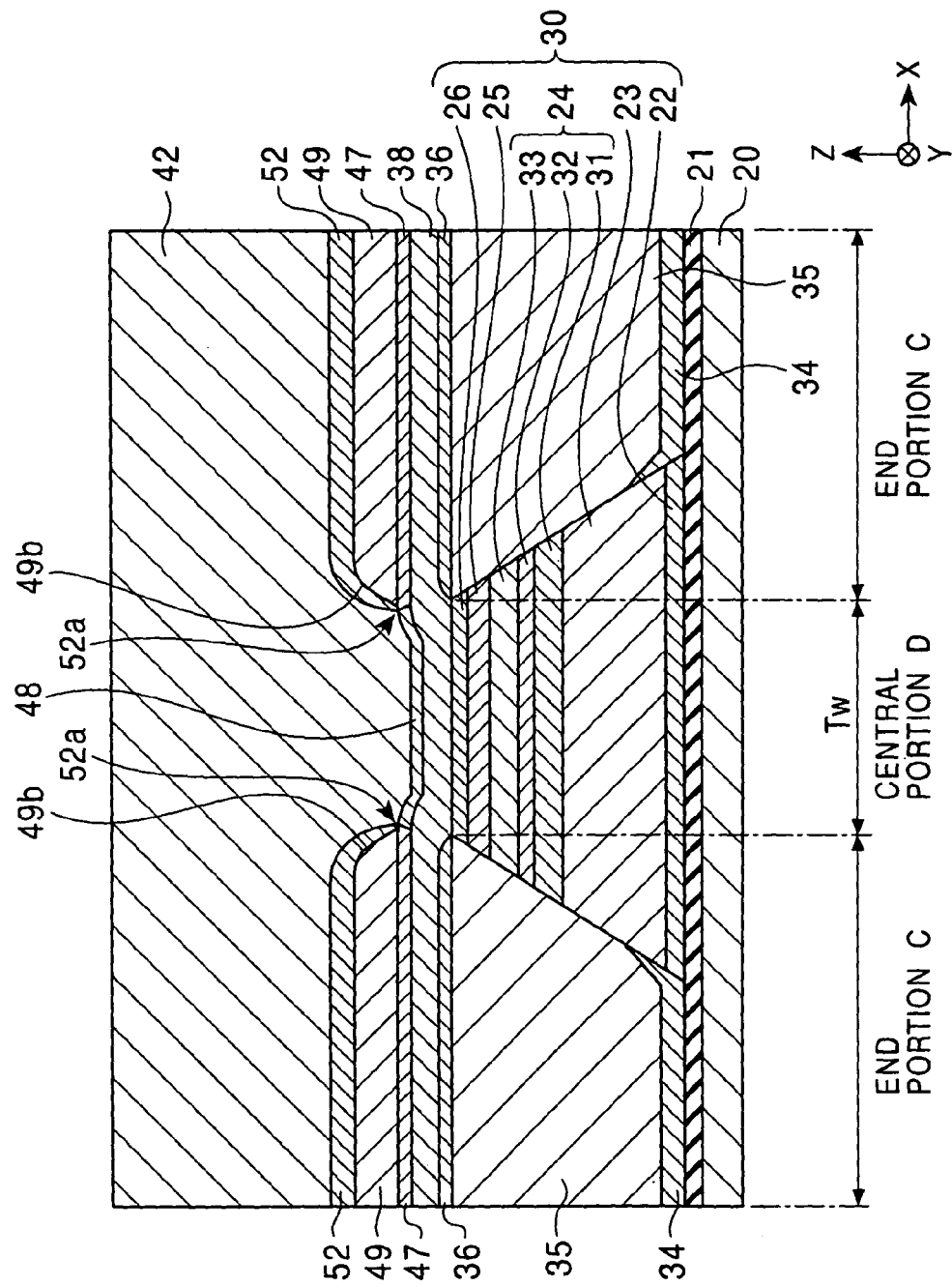
FIG. 6 is a fragmentary sectional view of a magnetic detecting element according to a sixth embodiment of the present invention, viewed from a side opposing a recording medium.

FIG. 6 is a fragmentary sectional view of a magnetic detecting element according to a sixth embodiment of the present invention, viewed from a side opposing a recording medium. The same reference numerals as in FIGS. 2 and 3 designate the same layers as in FIGS. 2 and 3.

In the magnetic detecting element shown in FIG. 6, the ferromagnetic layer 47 and the third antiferromagnetic layer 49 are formed on the second free magnetic layer 38 in the end portions, as in FIG. 3. In the embodiment shown in FIG. 6, in order to prevent sense current from diverging into the third antiferromagnetic layer 49 from the upper shield layer 42 doubling as an electrode, an insulating layer 52 is provided on the third antiferromagnetic layer 49. Preferably, the inner ends 52a of the insulating layer 52 in the track width direction (X direction) completely cover the inner end surfaces 49b of the third antiferromagnetic layer 49 and extend to overlap both ends of the second free magnetic layer 38 in the central portion D. Thus, the sense current is prevented from diverging into the third antiferromagnetic layer 49 effectively.

Figure 7:
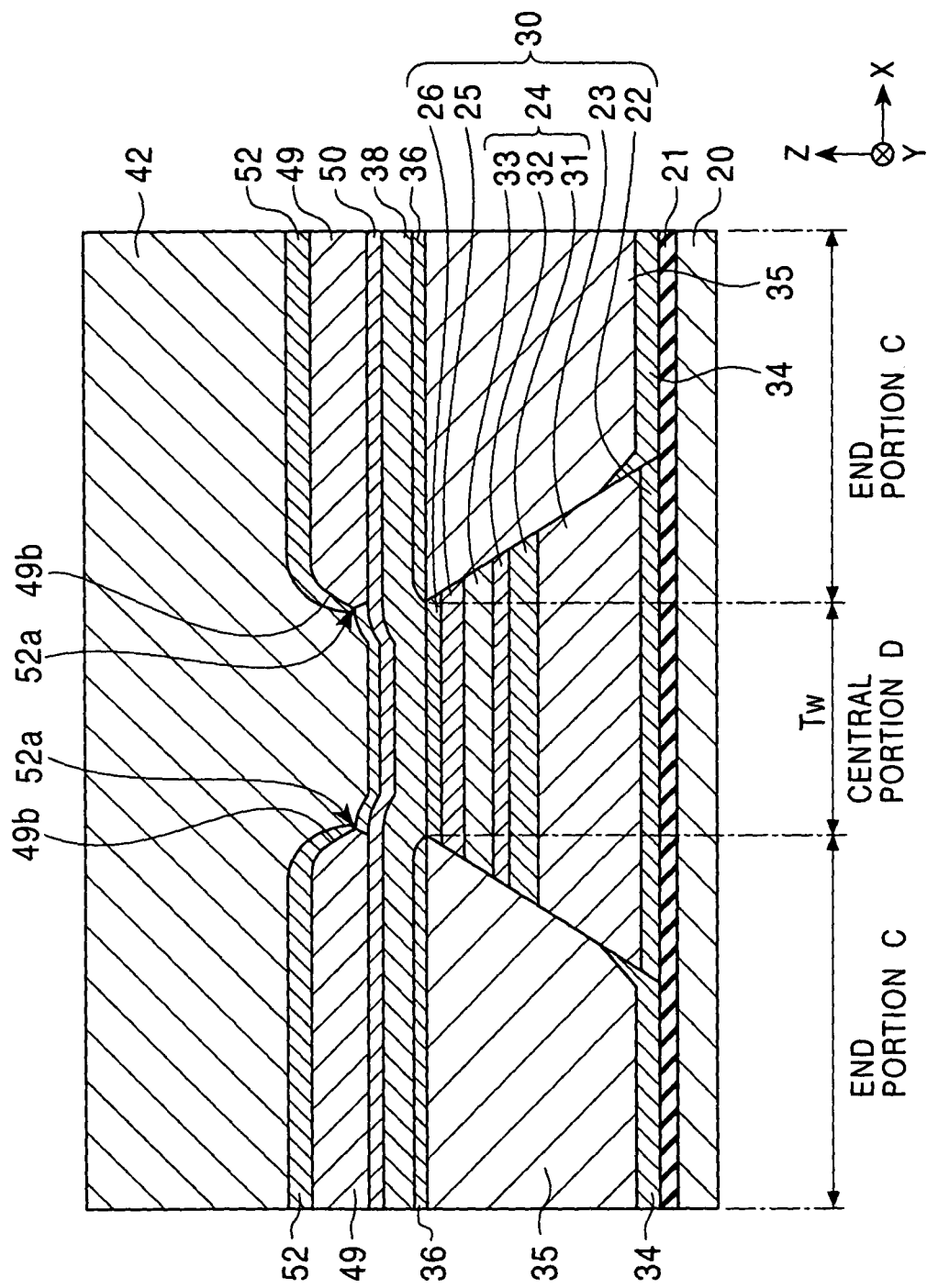
FIG. 7 is a fragmentary sectional view of a magnetic detecting element according to a seventh embodiment of the present invention, viewed from a side opposing a recording medium.

FIG. 7 is a fragmentary sectional view of a magnetic detecting element according to a seventh embodiment of the present invention, viewed from a side opposing a recording medium. The same reference numerals as in FIGS. 2 and 4 designate the same layers as in FIGS. 2 and 4.

In the magnetic detecting element shown in FIG. 7, the fourth antiferromagnetic layer 50 is formed on the second free magnetic layer 38, and the third antiferromagnetic layer 49 is formed on the fourth antiferromagnetic layer 50 in the end portions C, as in FIG. 4. In the seventh embodiment shown in FIG. 7, in order to prevent sense current from diverging into the third antiferromagnetic layer 49 from the upper shield layer 42 doubling as an electrode, an insulating layer 52 is provided on the third antiferromagnetic layer 49. Preferably, the inner ends 52a of the insulating layer 52 in the track width direction (X direction) completely cover the inner end surfaces 49b of the third antiferromagnetic layer 49 and extend to overlap both ends of the fourth antiferromagnetic layer 50 in the central portion D. Thus, the sense current is prevented from diverging into the third antiferromagnetic layer 49 effectively.

Figure 8:
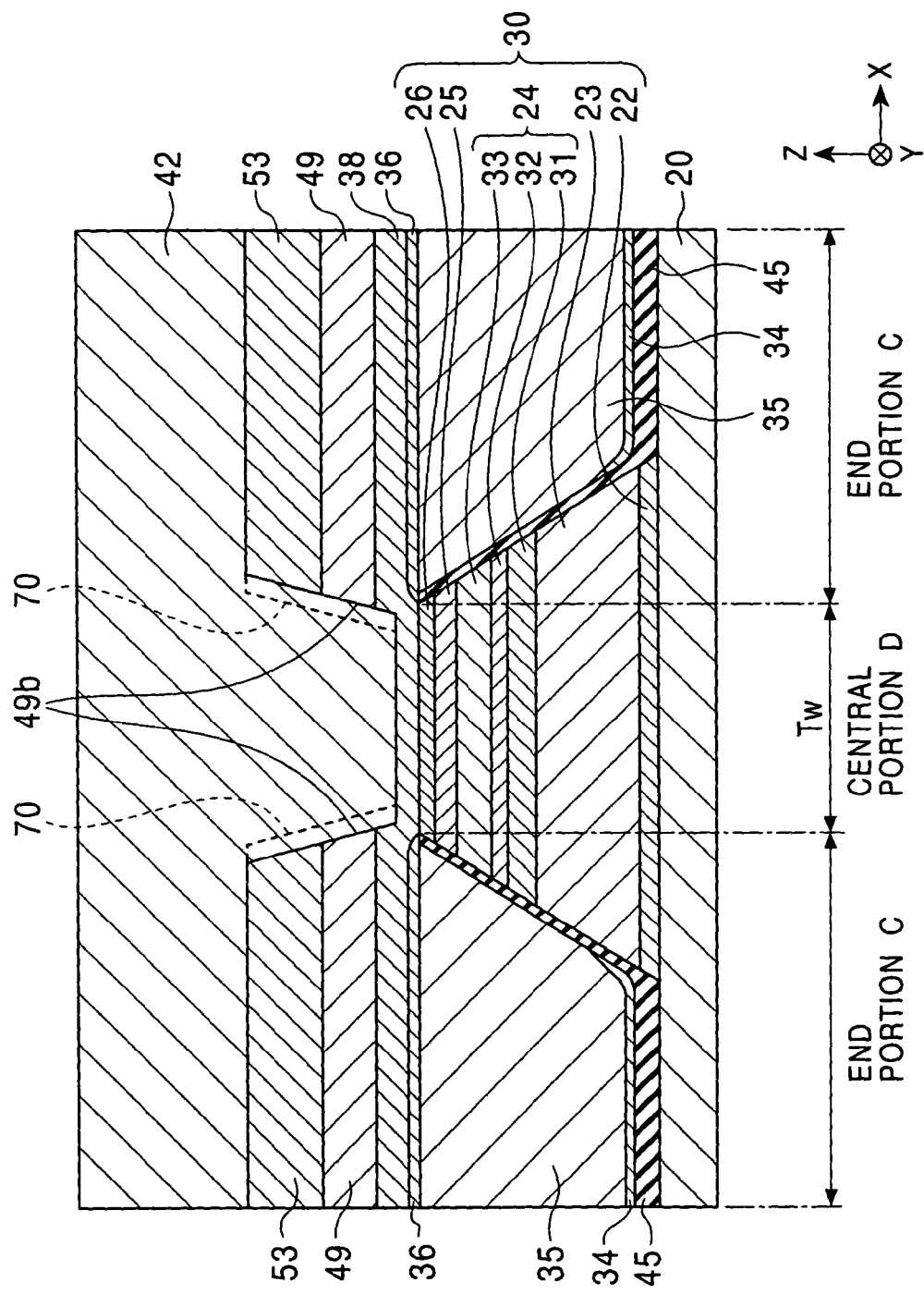
FIG. 8 is a fragmentary sectional view of a magnetic detecting element according to an eighth embodiment of the present invention, viewed from a side opposing a recording medium.

FIG. 8 is a fragmentary sectional view of a magnetic detecting element according to an eighth embodiment of the present invention, viewed from a side opposing a recording medium. The same reference numerals as in FIGS. 2 and 5 designate the same layers as in FIGS. 2 and 5.

In the magnetic detecting element shown in FIG. 8, the third antiferromagnetic layer 49 is formed on the second free magnetic layer 38, as in FIG. 5. In the eighth embodiment shown in FIG. 8, in order to prevent sense current from diverging into the third antiferromagnetic layer 49 from the upper shield layer 42 doubling as an electrode, an insulating layer 53 is provided on the third antiferromagnetic layer 49. Preferably, an insulating layer 70 is additionally provided on the inner side surfaces 49b of the third antiferromagnetic layer 49, as shown by a dotted line.

In the embodiments shown in FIGS. 6 to 8, since a bias magnetic field is applied to the second free magnetic layer 38 in the end portions C from above and below, the magnetization is surely fixed in the X direction. Thus, the magnetic detecting element can exhibit more excellent reproduction characteristics, and in which, for example, the off-track characteristic can further be enhanced and the satisfactory linearity can be maintained.

Also, the thickness of the third antiferromagnetic layer 49, which is disposed on the second free magnetic layer 38 in the end portions C, is reduced more effectively in comparison with the known element. This is because, since the third antiferromagnetic layer 49 serves as an adjunctive bias layer, the magnetization of the second free magnetic layer 38 in the end portions C can be fixed more effectively by the synergistic effect of the exchange coupling magnetic field generated between the third antiferromagnetic layer 49 and the ferromagnetic layer 47 in FIG. 6, between the third antiferromagnetic layer 49 and the fourth antiferromagnetic layer 50 in the end portion C in FIG. 7, or between the third antiferromagnetic layer 49 and the second free magnetic layer 38 in the end portion C in FIG. 8, and the exchange interaction between the second free magnetic layer 38 and the ferromagnetic layer 36 in the end portion C, if these exchange coupling magnetic fields have a certain degree of intensity.

As described above, since the thickness of the third antiferromagnetic layer 49 can be set smaller than that of the known element, the thickness of the protuberances in the end portions C can be reduced in comparison with the known element. Accordingly, the increase of the effective reproduction track width and PW50 can be suppressed effectively. In addition, insulation can be adequately ensured between the upper shield layer 42 and the electrode layer 40. Thus, the magnetic detecting element can exhibit excellent reproduction characteristics.

FIGS. 9 to 14 show manufacturing steps for the magnetic detecting element shown in FIG. 1 Each drawing is a fragmentary sectional view of the magnetic detecting element, viewed from a side opposing a recording medium.

Figure 9:
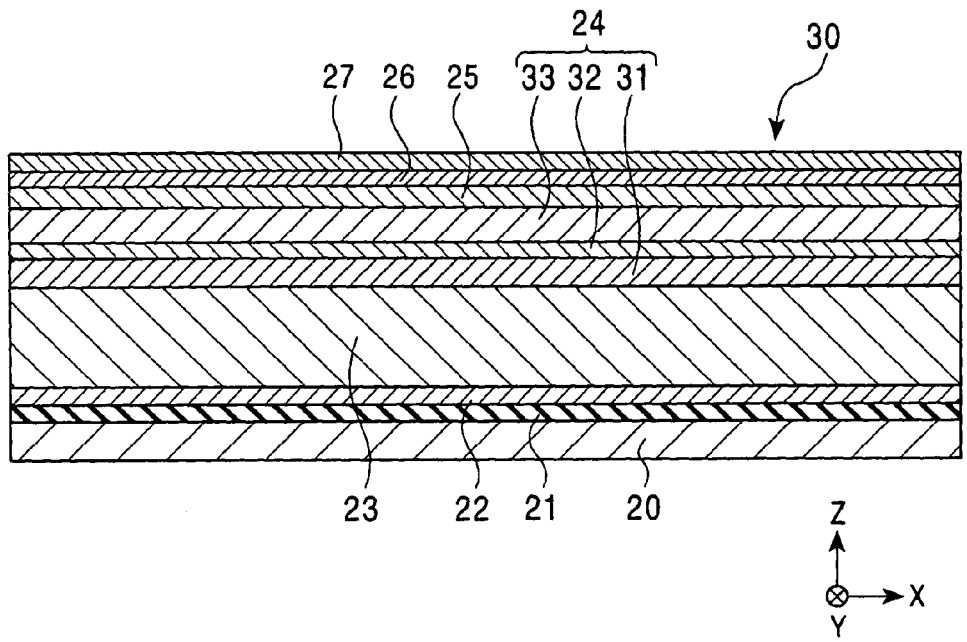
FIG. 9 is a representation of a step of manufacturing a magnetic detecting element shown in FIG. 1.

In a step shown in FIG. 9, the lower shield layer 20, the lower gap layer 21, the seed layer 22, the first antiferromagnetic layer 23, the pinned magnetic layer 24, the nonmagnetic material layer 25, the first free magnetic layer 26 and the nonmagnetic layer 27 are continuously deposited upward in that order. The layers from the seed layer 22 to nonmagnetic layer 27 are referred to as the multilayer laminate 30. Each layer is formed by sputtering or vapor deposition.

The lower shield layer 20 is formed of a magnetic material such as a NiFe alloy, and the lower gap layer 21 is formed of an insulating material such as $Al_2O_3$ or $SiO_2$. The seed layer 22 is formed of a NiFe alloy, a NiFeCr alloy, Cr, or the like. The first antiferromagnetic layer 23 is formed of: an antiferromagnetic material containing element X and Mn; or a X—Mn—X' alloy, wherein X is at least one element selected from the group consisting of Pt, Pd, Ir, Rh, Ru, and Os, and X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and are earth elements.

The pinned magnetic layer 24 has a so-called artificial ferrimagnetic structure including three layers composed of magnetic layers 31 and 33 separated by a nonmagnetic interlayer 32. The magnetic layers 31 and 32 are formed of a magnetic material, such as a CoFe alloy, a CoFeNi alloy, Co, or a NiFe alloy, and the nonmagnetic interlayer 33 is formed of a nonmagnetic material, such as Ru, Rh, Ir, Cr, Re, or Cu.

The nonmagnetic material layer 25 is formed of a conductive nonmagnetic material, such as Cu, Cr, Au, or Ag. The first free magnetic layer 26 is formed of a magnetic material such as a NiFe alloy or a NiFeCo alloy. The nonmagnetic layer 27 is formed of a noble metal. Preferably, the nonmagnetic layer 27 is formed of a noble metal containing at least one selected from the group consisting of Ru, Re, Pd, Os, Ir, Pt, Au, Rh, and Cu. Alternatively, the nonmagnetic layer 27 may be formed of Cr.

The nonmagnetic layer 27 formed of a noble metal, such as Ru or Cu, is dense and difficult to oxidize by exposure to the atmosphere. The nonmagnetic layer 27, therefore, adequately prevents the atmosphere from oxidizing the first free magnetic layer 26 even if the thickness thereof is small.

Preferably, the thickness of the nonmagnetic layer 27 is in the range of 3 to 20 Å. Even the nonmagnetic layer 27 having such a small thickness can adequately prevent the atmosphere from oxidizing the first free magnetic layer 26.

Alternatively, the nonmagnetic layer 27 may be oxidized to a specular layer, which will not be removed. The material of the specular layer will be described later.

Then, first annealing is performed. While a first magnetic field in a direction (Y direction) perpendicular to the track width Tw direction (X direction) is applied, the multilayer laminate 30 is heated to generate an exchange coupling magnetic field between the first antiferromagnetic layer 23 and one magnetic layer 31 of the pinned magnetic layer 24.

Thus, the magnetization of the magnetic layer 31 is fixed in the Y direction. The magnetization of the other magnetic layer 33 is fixed in the opposite direction to the Y direction by RKKY interaction between the magnetic layers 31 and 33. The first heat treatment temperature is set at 270° C. and the intensity of the magnetic field is set at 800 kA/m.

Figure 10:
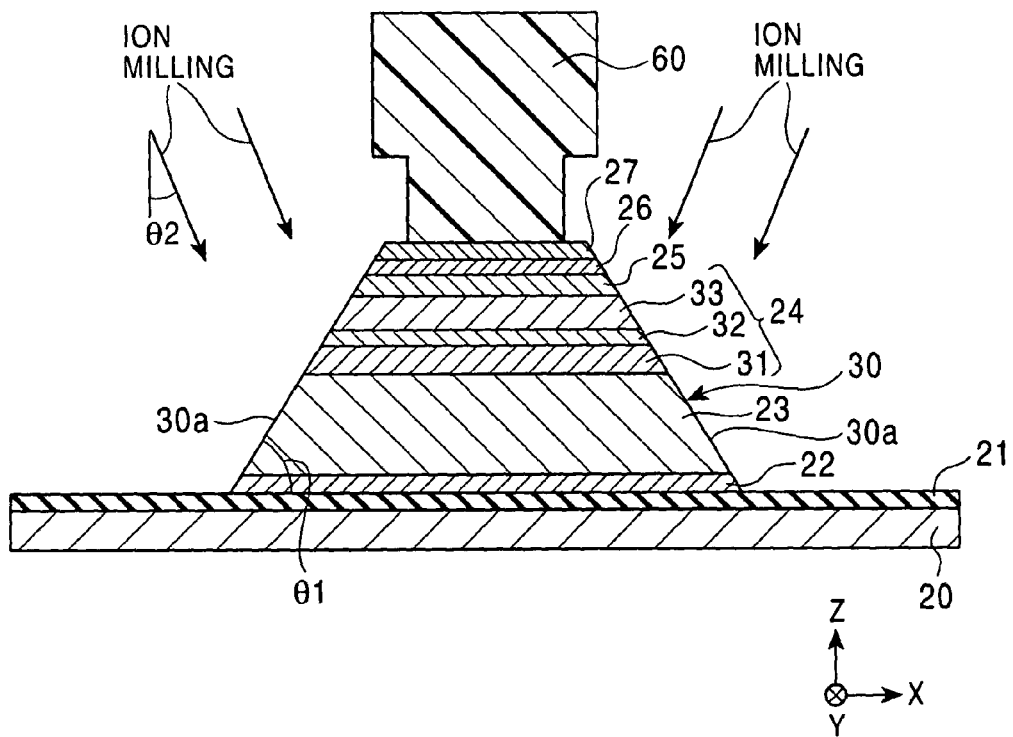
FIG. 10 is a representation of a step following FIG. 9.

Turning to FIG. 10, a resist layer 60 for lift-off is formed on the nonmagnetic layer 27.

Both sides in the track width direction (X direction) of the multilayer laminate 30 including the seed layer 22 to the nonmagnetic layer 27, not covered with the resist layer 60 are removed by ion milling or the like.

In the step shown in FIG. 10, both end surfaces 30a in the track width direction of the multilayer laminate 30 remaining under the resist layer 60 incline or bend such that the width of the multilayer laminate 30 in the track width direction gradually decreases from the bottom to the top thereof (in the Z direction).

The angle of the ion milling for removing both sides of the multilayer laminate 30 in the track width direction needs to be adjusted so that the angle θ1 between the lower surface and each side surface 30a of the multilayer laminate 30 remaining under the resist layer 60 is in the range of 60° to 90°. Preferably, the direction of ion milling is close to the direction perpendicular to the surface of the shield layer 20 (parallel to the Z direction) as much as possible. Preferably, the angle θ2 of the ion milling is in the range of 0° to 30°.

In the following step shown in FIG. 11, the seed layer 34 is deposited at both sides of the multilayer laminate 30 in the track width direction (X direction) by sputtering. The seed layer 34 is formed of the same material as that of the foregoing seed layer 22. Next, the second antiferromagnetic layer 35 is deposited from the upper surface of the seed layer 34 to each end surface 30a of the multilayer laminate 30 by sputtering. In addition, the ferromagnetic layer 36 and the nonmagnetic layer 37 are continuously deposited on the second antiferromagnetic layer 35.

The second antiferromagnetic layer 35 may be formed of an antiferromagnetic material used for the first antiferromagnetic layer 23. The ferromagnetic layer 36 is formed of a magnetic layer, such as a NiFe alloy, a CoFe alloy, or a CoFeNi alloy. The nonmagnetic layer 37 is formed of a material containing at least one selected from the group consisting of Ru, Re, Pd, Os, Ir, Pt, Au, Rh, Cu, and Cr, as with the nonmagnetic layer 27.

Figure 11:
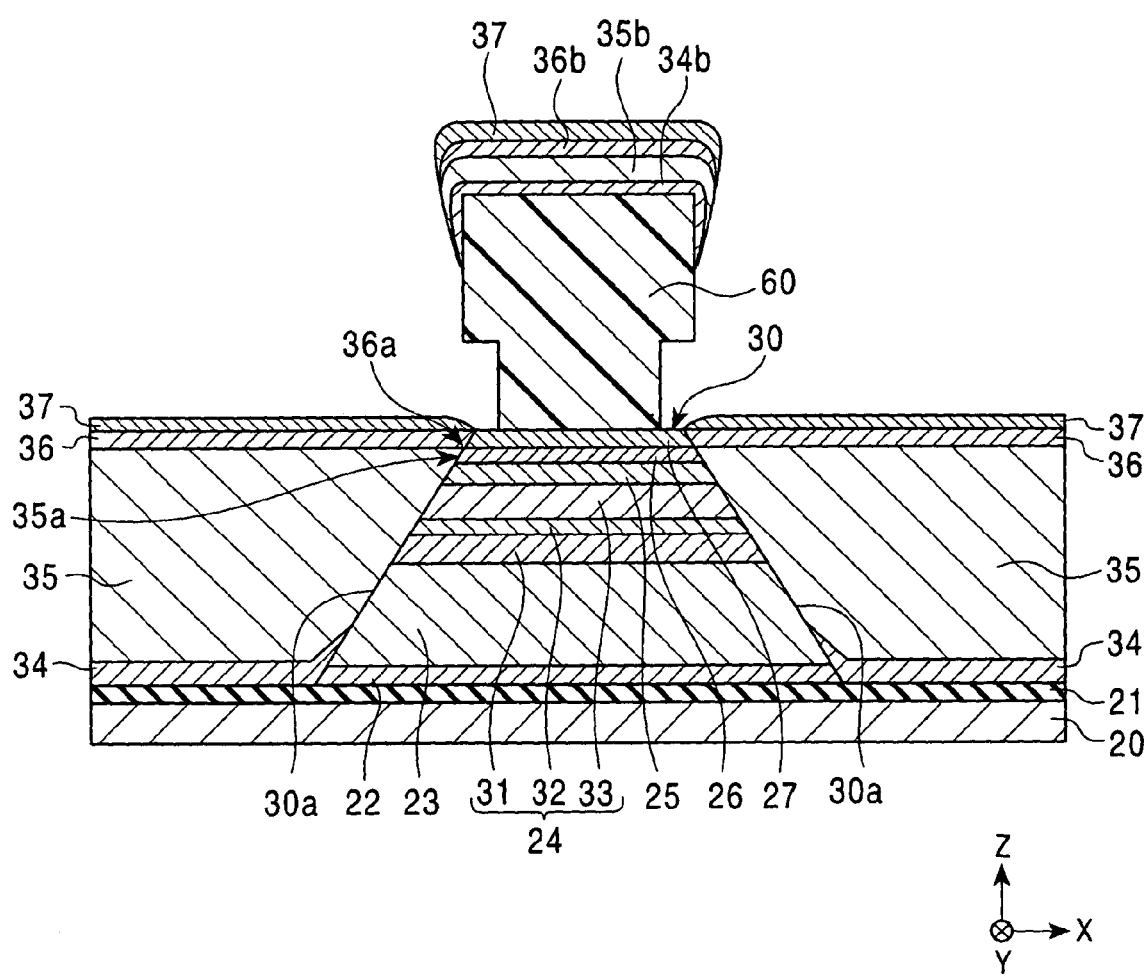
FIG. 11 is a representation of a step following FIG. 10.

In the step shown in FIG. 11, the second antiferromagnetic layer 35 and the ferromagnetic layer 36 are continuously deposited. An exchange coupling magnetic field can, therefore, be generated between the second antiferromagnetic layer 35 and the ferromagnetic layer 36 by second annealing in a magnetic field performed later. Also, since the angle θ1 between the lower surface and each side surface 30a of the multilayer laminate 30 is set in the range of 60° to 90°, the thickness of pointed portions 35a of the upside of the second antiferromagnetic layer 35 can be increased. Consequently, an exchange coupling magnetic field having a suitable intensity can be generated between each pointed portion 35a and the ferromagnetic layer 36, and, thus, the magnetization of edges 36a of the ferromagnetic layer 36 can be adequately fixed in the X direction.

The thickness of the second antiferromagnetic layer 35 may arbitrarily be set within the thickness of the multilayer laminate 30, and the second antiferromagnetic layer 35 is easy to form to a thickness more than or equal to the first antiferromagnetic layer 23. Therefore, the intensity of the exchange coupling magnetic field generated between the second antiferromagnetic layer 35 and the ferromagnetic layer 36 can be increased, and, thus, the magnetization of the ferromagnetic layer 36 can be adequately fixed in the X direction.

If the thickness of the second antiferromagnetic layer 35 is reduced to a thickness as small as that of the first antiferromagnetic layer 23, it is difficult to make the surface of the second free magnetic layer 38 even. However, the shield distance T6 between the shield layers in each end portion C of the element can be set less than the shield distance T7 in the central portion D and, accordingly, the effective track width and the PW50 can be reduced.

Preferably, the nonmagnetic layer 37 is formed to the same thickness as that of the nonmagnetic layer 27. Since the nonmagnetic layer 27 is formed to a thickness in the range of 3 to 20 Å, as described above, the thickness of the nonmagnetic layer 37 is also set in this range. The nonmagnetic layer 37 serves as an antioxidant layer for preventing the ferromagnetic layer 36 thereunder from oxidizing.

In the step shown in FIG. 11, a magnetic material layer 34b constituted of the same material as that of the seed layer 34, an antiferromagnetic material layer 35b constituted of the same material as that of the second antiferromagnetic layer 35, a ferromagnetic material layer 36b constituted of the same material as that of the ferromagnetic layer 36, and a nonmagnetic material layer 37b constituted of the same material as that of the nonmagnetic layer 37 are deposited on the resist layer 60 when the layers from the seed layer 34 to the nonmagnetic layer 37 are formed.

Figure 12:
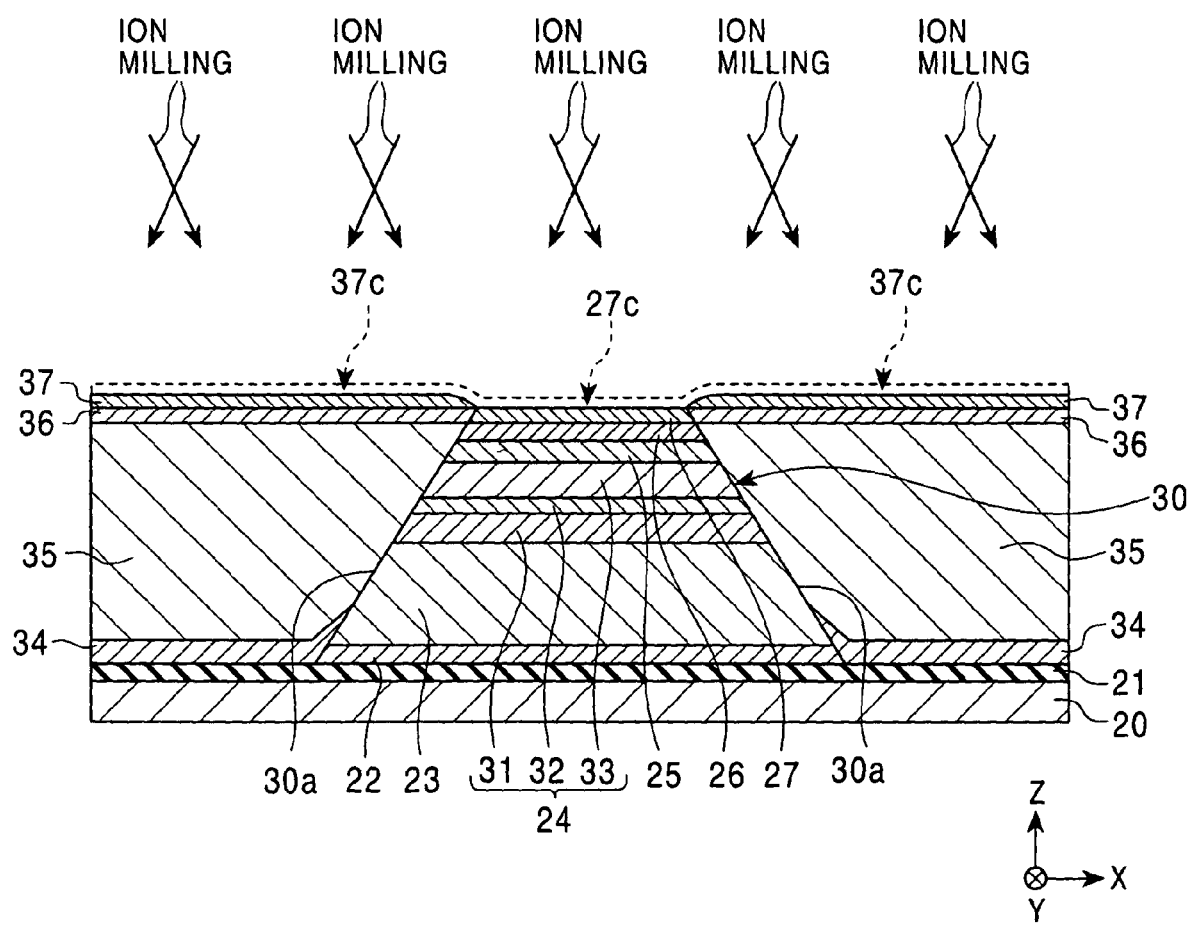
FIG. 12 is a representation of a step following FIG. 11.

Turning to a step shown in FIG. 12, after the resist layer 60 is removed (lifted off) with an organic solvent, the nonmagnetic layers 27 and 37 are removed by ion milling.

This ion milling can be performed at a low energy because the thickness of the nonmagnetic layers 27 and 37 is as small as 3 to 20 Å. Since the nonmagnetic layers 27 and 37 can be removed by low-energy ion milling, the ion milling can advantageously be controlled. In the low-energy ion milling, an ion beam having a beam voltage (acceleration voltage) of less than 1000 V is used. For example, the beam voltage is in the range of 100 to 500 V. In the present embodiment, an argon (Ar) ion beam having a low beam voltage of 200 V is used.

In FIG. 12, the nonmagnetic layers 27 and 37 are not completely removed and only the surface coats 27c and 37c thereof are removed. However, the entirety of the nonmagnetic layers 27 and 37 may be removed. Even if the entirety of the nonmagnetic layers 27 and 37 is removed, elements constituting these layers may have been diffused into the first free magnetic layer 26 and the ferromagnetic layer 36. Whether the elements have been diffused is examined by secondary ion mass spectrometry (SIMS) or energy-dispersive X-ray diffraction (EDX) using a transmission electron microscope (TEM).

If the nonmagnetic layers 27 and 37 are formed to the same thickness, the remaining thickness of the nonmagnetic layers 27 and 37 can be the same after the ion milling step.

Figure 13:
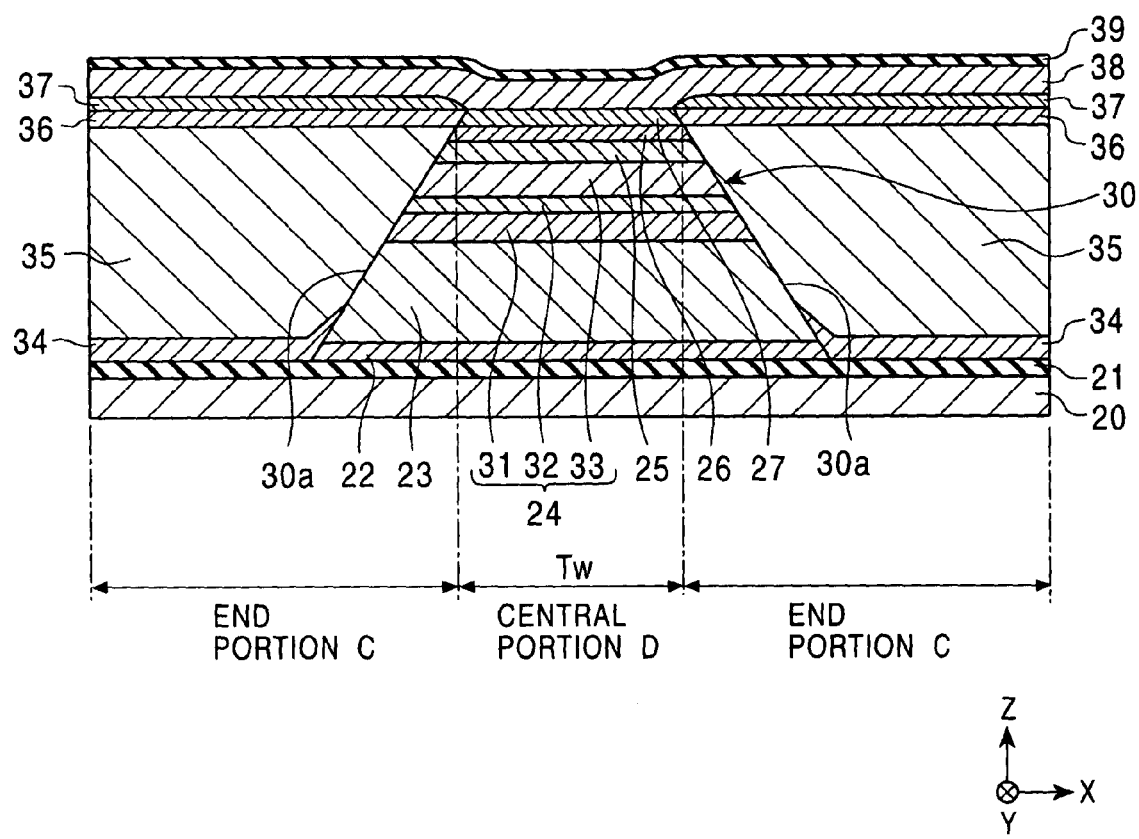
FIG. 13 is a representation of a step following FIG. 12.

Turning to a step shown in FIG. 13, the second free magnetic layer 38 is deposited from the upper surface of the nonmagnetic layer 27 to the upper surface of the nonmagnetic layer 37 by sputtering, and, further, the cap layer 39 is deposited on the second free magnetic layer 38 by sputtering.

Preferably, the second free magnetic layer 38 is formed of a magnetic material such as a NiFe alloy. The cap layer 39 serves as an anti-oxidant layer for preventing the second free magnetic layer 38 from oxidizing. The cap layer 39 may be layered with at least one of a specular layer and a backed layer.

Exemplary materials of the specular layer include oxides, such as Fe—O, Ni—O, Co—O, Co—Fe—O, Co—Fe—Ni—O, Al—O, Al-Q-O, and R—O; nitrides, such as Al—N, Al-Q'-N, and R—N'; and semimetallic whistler alloys, wherein Q is at least one selected from the group consisting of B, Si, N, Ti, V, Cr, Mn, Fe, Co, and Ni, R is at least one selected from the group consisting of Cu, Ti, V, Cr, Zr, Nb, Mo, Hf, Ta, and W, Q' is at least one selected from the group consisting of B, Si, O, Ti, V, Cr, Mn, Fe, Co, and Ni, and R' is at least one selected from the group consisting of Ti, V, Cr, Zr, Nb, Mo, Hf, Ta, and W. For example, a Ta film is formed to a thickness of about 15 Å on the second free magnetic layer 38, and the entire Ta film is oxidized to a specular layer.

By providing the specular layer, it becomes possible to extend the mean free path $\lambda+$ of the up-spin conduction electrons and, thus, to increase the difference between the mean free path $\lambda+$ of the up-spin conduction electrons and the mean free path $\lambda-$ of down-spin conduction electrons. Accordingly, the rate of change in resistance ($\Delta R/R$) and reproduction output can be increased.

The backed layer is formed of, for example, Cu, Au, Cr, or Ru. By providing the backed layer, the mean free path of up-spin conduction electrons contributing to the magnetoresistance effect is extended, and, thus, a large rate of change in resistance can be obtained in the magnetic element by a so-called spin filter effect. Thus, the magnetic element is adapted to high density recording.

Then, second annealing in a magnetic field is performed. In this instance, the direction of the magnetic field is in the track width direction (X direction). The intensity of the applied magnetic field is set lower than that of the exchange anisotropic magnetic field of the first antiferromagnetic layer 23, and the temperature of heat treatment is set lower than the blocking temperature of the first antiferromagnetic layer 23.

In FIG. 13, the second free magnetic layer 38 is formed above the first free magnetic layer 26 with the nonmagnetic layer 27 therebetween and above the ferromagnetic layer 36 with the nonmagnetic layer 37 therebetween. The thickness of the nonmagnetic layers 27 and 37 is, for example, 6 to 11 Å. By setting the thickness of the nonmagnetic layers 27 and 37 to such a small extent, an exchange coupling occurs by RKKY interaction between the first free magnetic layer 26 and ferromagnetic layer 36 and the second free magnetic layer, and, thereby, the magnetization of the first free magnetic layer 26 and ferromagnetic layer 36 and the magnetization of the second free magnetic layer are oriented antiparallel to each other in the track width direction.

On the other hand, if the thicknesses of the nonmagnetic layers 27 and 37 are smaller than 6 Å, the magnetizations of the first free magnetic layer 26 and ferromagnetic layer 36 and the magnetization of the second free magnetic layer 38 are oriented to the same direction in the track width direction.

By performing the second magnetic field annealing, an exchange coupling magnetic field is generated between the second antiferromagnetic layer 35 and the ferromagnetic layer 36 in the X direction, thereby fixing the magnetization of the ferromagnetic layer 36 in the X direction. Then, if the exchange coupling occurs between the ferromagnetic layer 36 and first free magnetic layer 26 and the second free magnetic layer 38 by RKKY interaction, the magnetization of the second free magnetic layer 38 in both end portions C of the element is fixed in the direction antiparallel to the magnetization direction of the ferromagnetic layer 36. On the other hand, in the central portion D, the second free magnetic layer 38 is put into a single magnetic domain state to such a small extent that the magnetization thereof is reversible in response to an external magnetic field though the magnetization direction thereof is the same as in the end portions C. Also, the magnetization of the first free magnetic layer 26 is oriented in the opposite direction to that of the second free magnetic layer 38, that is, in the same direction as that of the ferromagnetic layer 36, by RKKY interaction with the second free magnetic layer 38 in the central portion D. The first free magnetic layer 26 is put into a single magnetic domain state such a small extent that the magnetization thereof is reversible in response to an external magnetic field, as with the magnetization of the second free magnetic layer 38 in the central portion D.

One nonmagnetic layer 27 and the other nonmagnetic layer 37 may have thicknesses, for example, of less than 6 Å and in the range of 6 to 11 Å, respectively. Even such a case, the magnetizations of the first free magnetic layer 26, the second free magnetic layer 38, and the ferromagnetic layer 36 can adequately be controlled. Specifically, for example, when the nonmagnetic layer 37 has a thickness in the range of 6 to 11 Å, by performing the second magnetic field annealing, an exchange coupling magnetic field is generated between the second antiferromagnetic layer 35 and the ferromagnetic layer 36 in the X direction, thereby fixing the magnetization of the ferromagnetic layer 36 in the X direction. As a result, an exchange coupling occurs between the ferromagnetic layer 36 and the second free magnetic layer 38 by RKKY interaction, thereby fixing the magnetization of the second free magnetic layer 38 in the end portions C in the direction antiparallel to the magnetization direction of the ferromagnetic layer 36. When the nonmagnetic layer 27 has a thickness of less than 6 Å, the second free magnetic layer 38 in the central portion D is magnetized in the same direction as in the end portions C, and it is put into a single magnetic domain state to such a small extent that the magnetization thereof is reversible in response to an external magnetic field. Also, the first free magnetic layer 26 is magnetized in the same direction as that of the second free magnetic layer 38 in the central portion D, and it is put into a single magnetic domain state such a small extent that the magnetization thereof is reversible in response to an external magnetic field, as with the magnetization of the second free magnetic layer 38 in the central portion D.

Figure 14:
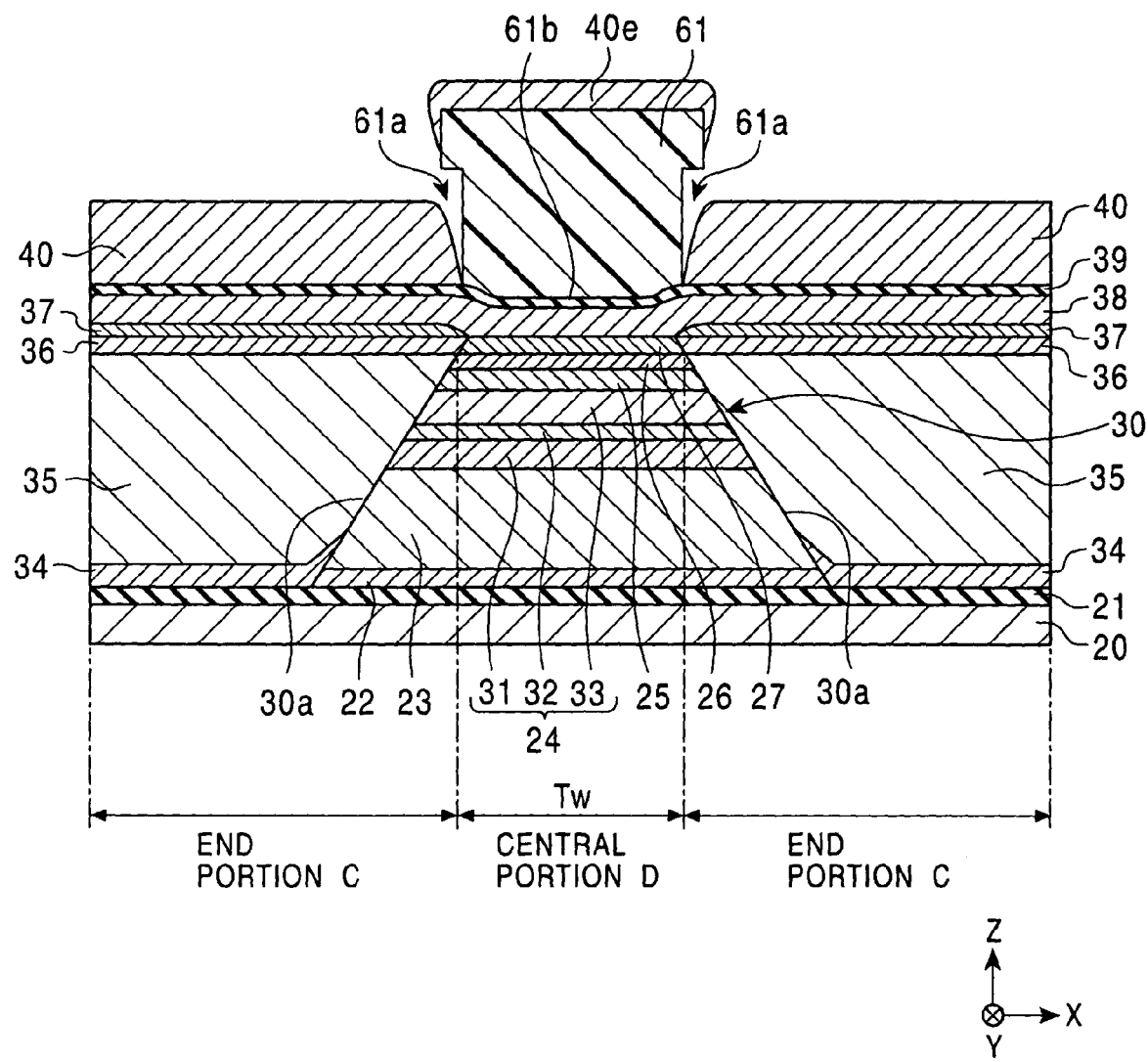
FIG. 14 is a representation of a step following FIG. 13.

Turning to a step shown in FIG. 14, a resist layer 61 for lift-off is deposited on the cap layer 39. The width of the lower surface 61b of the resist layer 61 in the track width direction (X direction) is set slightly smaller than or equal to the width of the central portion D in the track width direction. Then, the electrode layer 40 is deposited on the cap layer 39 in the end portions C, not covered with the resist layer 61, by sputtering. In order to deposit the electrode layer 40 even in the recesses 61a on the lower side of the resist layer 61 when the electrode layer 40 is deposited, the electrode layer 40 is formed at a sputtering angle tilted with respect to the Z direction. The cap layer 39 in the end portions C, not covered with the resist layer 61 may be removed by ion milling before the deposition of the electrode layer 40. This is because, if the cap layer 39 is insulative, sense current does not easily flow from the electrode layer 40 to the multilayer laminate 30 and, consequently, reproduction output is reduced.

When the electrode layer is formed, an electrode material layer 40e constituted of the same material as in the electrode layer 40 is deposited on the resist layer 61. This resist layer 61 is removed.

The width of the space in the electrode layer 40 in the track width direction (X direction) becomes smaller than or equal to the width of the central portion D in the track width direction.

After the resist layer is removed, the upper gap layer 41 and the upper shield layer 42 are formed from the upper surface of the electrode layer 40 to the upper surface of the cap layer 39 exposed in the space in the electrode layers 40. Thus, the magnetic detecting element shown in FIG. 1 is completed.

In order to manufacture the magnetic detecting element shown in FIG. 2, the steps shown in FIGS. 9 to 14 may be used.

Specifically, first, the step shown in FIG. 9 is performed without forming the lower gap layer 21, and subsequently the step shown in FIG. 10 is performed. Then, in the step shown in FIG. 11, the insulating layer 45 is deposited from the upper surface of the lower shield layer 20, which extends in the track width direction beyond the width of the multilayer laminate 30, to each side surface of the multilayer laminate 30. The deposition of the insulating layer 45 is performed by sputtering, such as ion-beam sputtering, and the angle of the sputtering is tilted with respect to the Z direction so that the insulating layer 45 is formed to a constant thickness even on the side surfaces 30a of the multilayer laminate 30.

Then, the seed layer 34, the second antiferromagnetic layer 35, the ferromagnetic layer 36, and the nonmagnetic layer 37 are deposited, and the steps shown in FIGS. 12 and 13 are subsequently performed. Then, in the step in FIG. 14, the insulating layer 46 is deposited at each side of the resist layer 61 in the track width direction by sputtering. After the resist layer 61 is removed, the upper shield layer 42 is deposited from the upper surface of the insulating layer 46 to the upper surface of the cap layer 39 exposed in the space in the insulating layer 46. Thus, the magnetic detecting element shown in FIG. 2 is completed.

Also, in order to manufacture the magnetic detecting element shown in FIG. 3, the steps shown in FIGS. 9 to 13 may be used.

Figure 15:
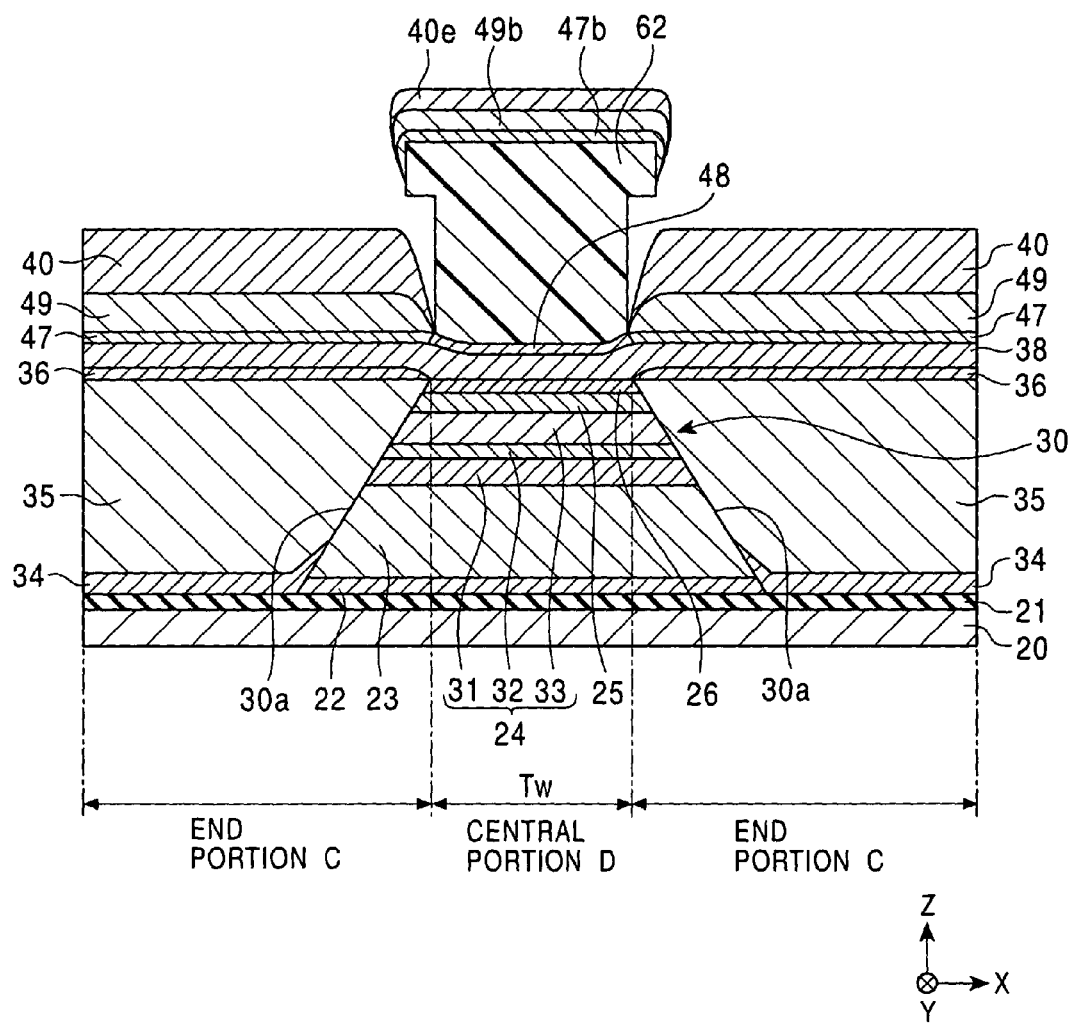
FIG. 15 is a representation of a step of manufacturing a magnetic detecting element shown in FIG. 3.

Specifically, the same steps as in FIGS. 9 to 13 are performed. In this instance, however, the nonmagnetic layers 27 and 37 are completely removed in the step in FIG. 12, and the nonmagnetic layer 48 is formed on the second free magnetic layer 38 instead of forming the cap layer 39, in the step in FIG. 13. Also, the second annealing in a magnetic field has not yet been performed up to this point. Then, a step shown in FIG. 15 is performed.

In this step, a resist layer 62 for lift-off is formed on the nonmagnetic layer 48. Preferably, the width of the lower surface of the resist layer 62 in the track width direction (X direction) is the same as the width of the central portion D in the track width direction. Next, the nonmagnetic layer 48 above the end portions C, not covered with the resist layer 62 is removed by ion milling. The nonmagnetic layer 48 is formed of Ru or the like to a thickness in the range of 3 to 20 Å. The nonmagnetic layer 48 can, therefore, be removed by a low-energy ion milling. Although, in the step in FIG. 15, the nonmagnetic layer 48 overlying the end portions C is completely removed, it may partly be left.

For example, when the nonmagnetic layer 37 on the ferromagnetic layer 36 is completely removed, as shown in FIG. 3, and a bias magnetic field in the same direction as the magnetization direction of the ferromagnetic layer 36 is applied to the second free magnetic layer 38 in end portions C from the ferromagnetic layer 36 by the second magnetic field annealing, the thickness of the nonmagnetic layer 48 may be adjusted so that the a bias magnetic field in the same direction as the magnetization direction of the ferromagnetic layer 47 on the second free magnetic layer 38 is also applied to the second free magnetic layer 38 in end portions C from the ferromagnetic layer 47. In this instance, the thickness of the nonmagnetic layer 48 is less than 6 Å.

When part of the nonmagnetic layer 37 on the ferromagnetic layer 36 is left and a bias magnetic field in the opposite direction to the magnetization direction of the ferromagnetic layer 36 is applied to the second free magnetic layer 38 in the end portions C from the ferromagnetic layer 36 by the second magnetic field annealing, the thickness of the nonmagnetic layer 48 may be adjusted so that the a bias magnetic field in the opposite direction to the magnetization direction of the ferromagnetic layer 47 on the second free magnetic layer 38 is also applied to the second free magnetic layer 38 in the end portions C from the ferromagnetic layer 47. In this instance, the thickness of the nonmagnetic layer 48 is in the range of 6 to 11 Å.

As described above, the magnetization of the second free magnetic layer 38 can adequately be controlled by only one magnetic field annealing.

In the step shown in FIG. 15, the nonmagnetic layer 48 in the end portions C, not covered with the resist layer 62 is completely removed, and then, the ferromagnetic layer 47, the third antiferromagnetic layer 49, and the electrode layer 40 are continuously deposited on the surface of the second free magnetic layer 38 exposed at the end portions C. The third antiferromagnetic layer 49 can be formed of the same material as that of the first antiferromagnetic layer 23 and the second antiferromagnetic layer 35.

After the resist layer 62 is removed, second annealing in a magnetic field is performed. In this instance, the direction of the magnetic field is in the track width direction (X direction). The intensity of the applied magnetic field is set lower than that of the exchange anisotropic magnetic field of the first antiferromagnetic layer 23, and the temperature of heat treatment is set lower than the blocking temperature of the first antiferromagnetic layer 23.

In FIG. 15, exchange coupling magnetic fields are generated in the X direction between the second antiferromagnetic layer 35 and the ferromagnetic layer 36 and between the third antiferromagnetic layer 49 and the ferromagnetic layer 47 by the second magnetic field annealing, thereby fixing the magnetizations of the ferromagnetic layers 36 and 47 in the X direction. Furthermore, the magnetization the second free magnetic layer 38 in the end portions C is fixed in the X direction, by exchange interaction between the ferromagnetic layers 36 and 47. On the other hand, although the second free magnetic layer 38 in the central portion D and the first free magnetic layer 26 are magnetized in the X direction, they are put into single magnetic domain states such a small extent that their magnetizations are reversible in response to an external magnetic field.

Then, the upper gap layer 41 is formed from the upper surface of the electrode layer 40 to the upper surface of the nonmagnetic layer 48 exposed in the space in the electrode layer 40, and, further, the upper shield layer 42 is formed on the upper gap layer 41. Thus, the magnetic detecting element shown in FIG. 3 is completed.

In order to manufacture the magnetic detecting element shown in FIG. 4, the steps shown in FIGS. 9 to 12 may be used.

Figure 16:
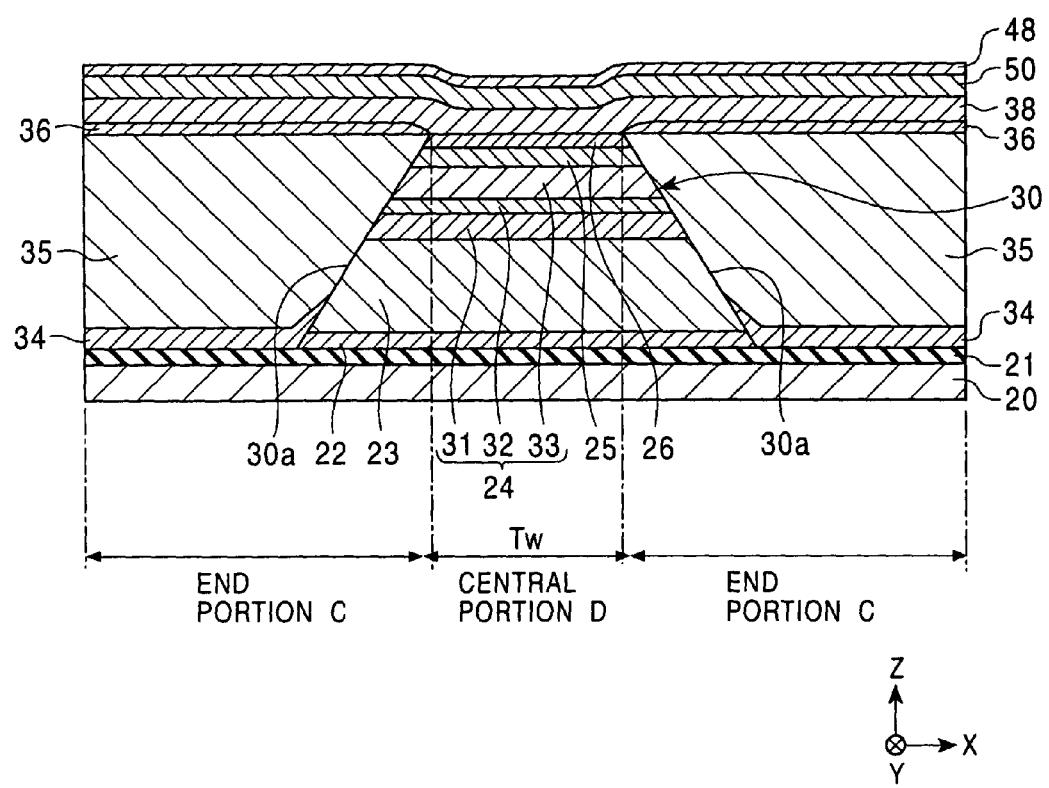
FIG. 16 is a representation of a step of manufacturing a magnetic detecting element shown in FIG. 4.

Specifically, following the steps shown in FIGS. 9 to 12, a step shown in FIG. 16 is performed. In this instance, however, the nonmagnetic layers 27 and 37 are completely removed in the step shown in FIG. 12.

In the step shown in FIG. 16, the second free magnetic layer 38, the fourth antiferromagnetic layer 50, and the nonmagnetic layer 48 are continuously deposited from the upper surface of the ferromagnetic layer 36 to the upper surface of the first free magnetic layer 26, by sputtering. The fourth antiferromagnetic layer 50 can be formed of the same antiferromagnetic material as that of the first antiferromagnetic layer 23, the second antiferromagnetic layer 35, and the third antiferromagnetic layer 49. The thickness of the fourth antiferromagnetic layer 50 is set in the range of 20 to 50 Å. Preferably, the nonmagnetic layer 48 is formed of at least one selected from the group consisting of Cu, Ru, Re, Pd, Os, Ir, Pt, Au, Rh, and Cr to a thickness as small as 3 to 20 Å. By forming the nonmagnetic layer 48 on the fourth antiferromagnetic layer 50, the fourth antiferromagnetic layer 50 is prevented from oxidizing even if the magnetic detecting element in course of manufacture is exposed to the atmosphere in the step shown in FIG. 16.

Figure 17:
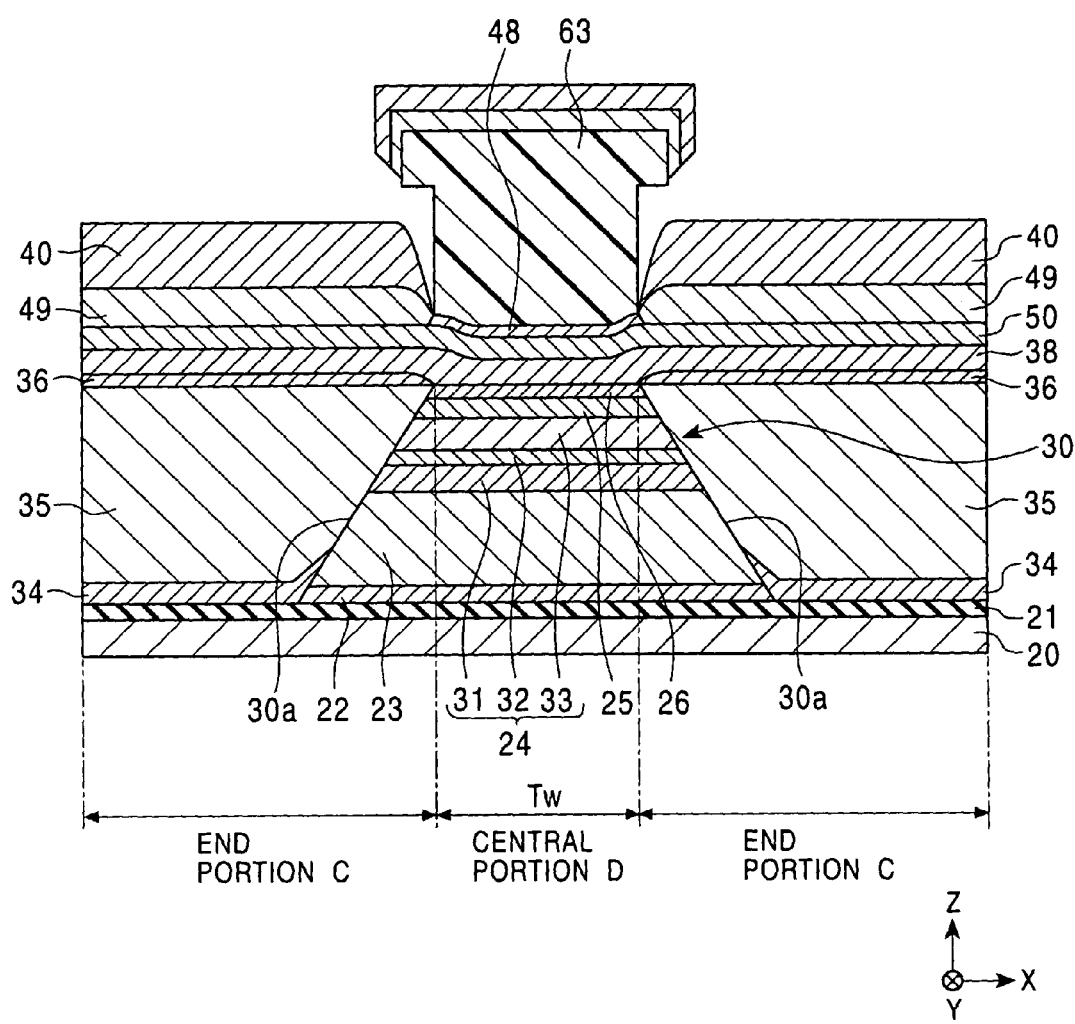
FIG. 17 is a representation of a step following FIG. 16.

Turning to the step shown in FIG. 17, a resist layer 63 for lift-off is formed on the nonmagnetic layer 48. Preferably, the width of the lower surface of the resist layer 63 in the track width direction (X direction) is the same as the width of the central portion D in the track width direction. The nonmagnetic layer 48 overlying the end portions C, not covered with the resist layer 63 is removed by ion milling. The nonmagnetic layer 48 is formed of Ru or the like to a thickness in the range of 3 to 20 Å. The nonmagnetic layer 48 can, therefore, be removed by a low-energy ion milling. Although, in the step in FIG. 17, the nonmagnetic layer 48 overlying the end portions C is completely removed, it may partly be left. However, the thickness of the remaining nonmagnetic layer 48 is as very small as 3 Å or less.

Then, the third antiferromagnetic layer 49 and the electrode layer 40 are continuously formed on the fourth antiferromagnetic layer 50 exposed at each side of the resist layer 63 in the track width direction, by sputtering, as shown in FIG. 17. After the resist layer 63 is removed, second annealing in a magnetic field is performed.

By forming the fourth antiferromagnetic layer 50 to a thickness as small as 50 Å or less, as described above, the fourth antiferromagnetic layer 50 in the central portion D the does not exhibit antiferromagnetic characteristics. The fourth antiferromagnetic layer 5 in the central portion D is, therefore, difficult to modify for regularization even if it is subjected to second annealing in a magnetic field. Consequently, since an exchange coupling magnetic field is not generated between the fourth antiferromagnetic layer 50 and the second free magnetic layer 38 in the central portion D, or it is small if generated, the magnetization the second free magnetic layer 38 in the central portion D is not fixed as firmly as that of the pinned magnetic layer 24.

On the other hand, if the thickness of the fourth antiferromagnetic layer 50 is less than 20 Å, the fourth antiferromagnetic layer 50 in the element end portions C does not easily exhibit antiferromagnetic characteristics even if the third antiferromagnetic layer 49 is provided on the end portions C. Consequently, an exchange coupling magnetic field having a suitable intensity is not generated between the fourth antiferromagnetic layer 50 and the second free magnetic layer 38 in the end portions C. This is the reason why the thickness of the fourth antiferromagnetic layer 50 is set at 20 Å or more.

Also, if the third antiferromagnetic layer 49 is formed on the second free magnetic layer 38 in the end portions C without the fourth antiferromagnetic layer 50, an exchange coupling magnetic field having a suitable intensity is not generated between the fourth antiferromagnetic layer 50 and the second free magnetic layer 38 in the end portions C. This is the reason for providing the fourth antiferromagnetic layer 50.

After the second magnetic field annealing, the upper gap layer 41 is formed from the upper surface of the electrode layer 40 to the upper surface of the nonmagnetic layer 48 exposed in the space in the electrode layer 40, and, further, the upper shield layer 42 is formed on the upper gap layer 41. Thus, the magnetic detecting element shown in FIG. 4 is completed.

In order to manufacture the magnetic detecting element shown in FIG. 5, the steps shown in FIGS. 9 to 12 may be used.

Figure 18:
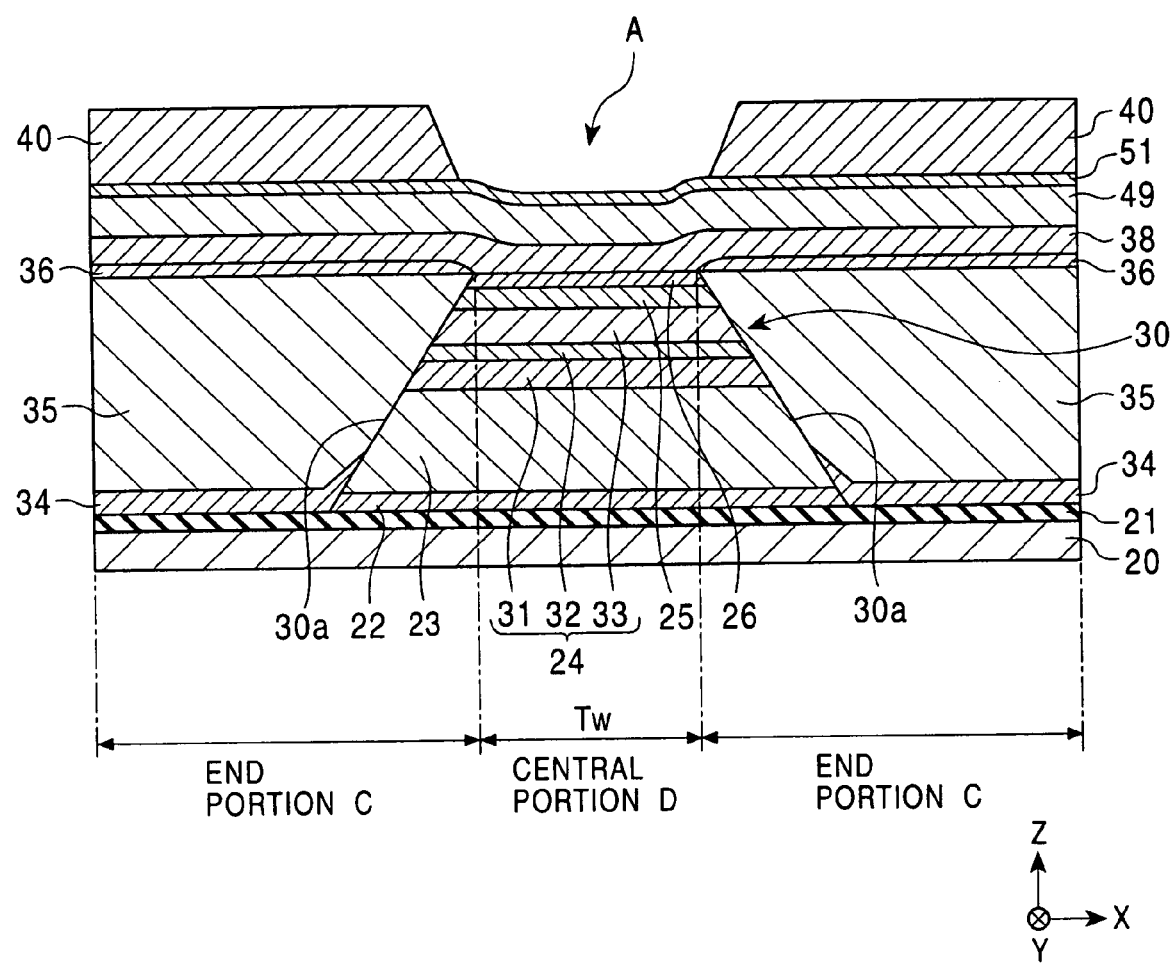
FIG. 18 is a representation of a step of manufacturing a magnetic detecting element shown in FIG. 5.

Specifically, following the steps shown in FIGS. 9 to 12, a step shown in FIG. 18 is performed. In this instance, however, the nonmagnetic layers 27 and 37 are completely removed in the step shown in FIG. 12.

In the step shown in FIG. 18, the second free magnetic layer 38, the third antiferromagnetic layer 49, and the nonmagnetic interlayer 51 of Ta, Cr, or the like are continuously deposited from the upper surface of the ferromagnetic layer 36 to the upper surface of the first free magnetic layer 26, by sputtering.

Then, the electrode layer 40 is deposited with a space A having a predetermined width in the track width direction, on the nonmagnetic interlayer 51. The electrode layer has a function as a mask layer.

The width of the space in the electrode layer 40 is set larger than or equal to the width of the central portion D in the track width direction (X direction).

In order to from the space A in the electrode layer 40, for example, a resist layer (not shown in the drawing) is formed in the region of the nonmagnetic interlayer 51 where the space is to be formed. The electrode layer 40 is formed on each side of the nonmagnetic interlayer 51 in the track width direction, not covered with the resist layer, and then, the resist layer is removed.

Alternatively, after the electrode layer 40 is formed on the entire surface of the nonmagnetic interlayer 51, a resist layer (not shown in the drawing) is formed on each side of the electrode layer 40 in the track width direction, and the electrode layer 40 in the central portion D, not covered with the resist layer is subjected to etching, such as reactive ion etching (RIE), to be removed. Then, the resist layer is removed. The resist layer may be left. Instead of the resist layer, a metal mask may be used.

Figure 19:
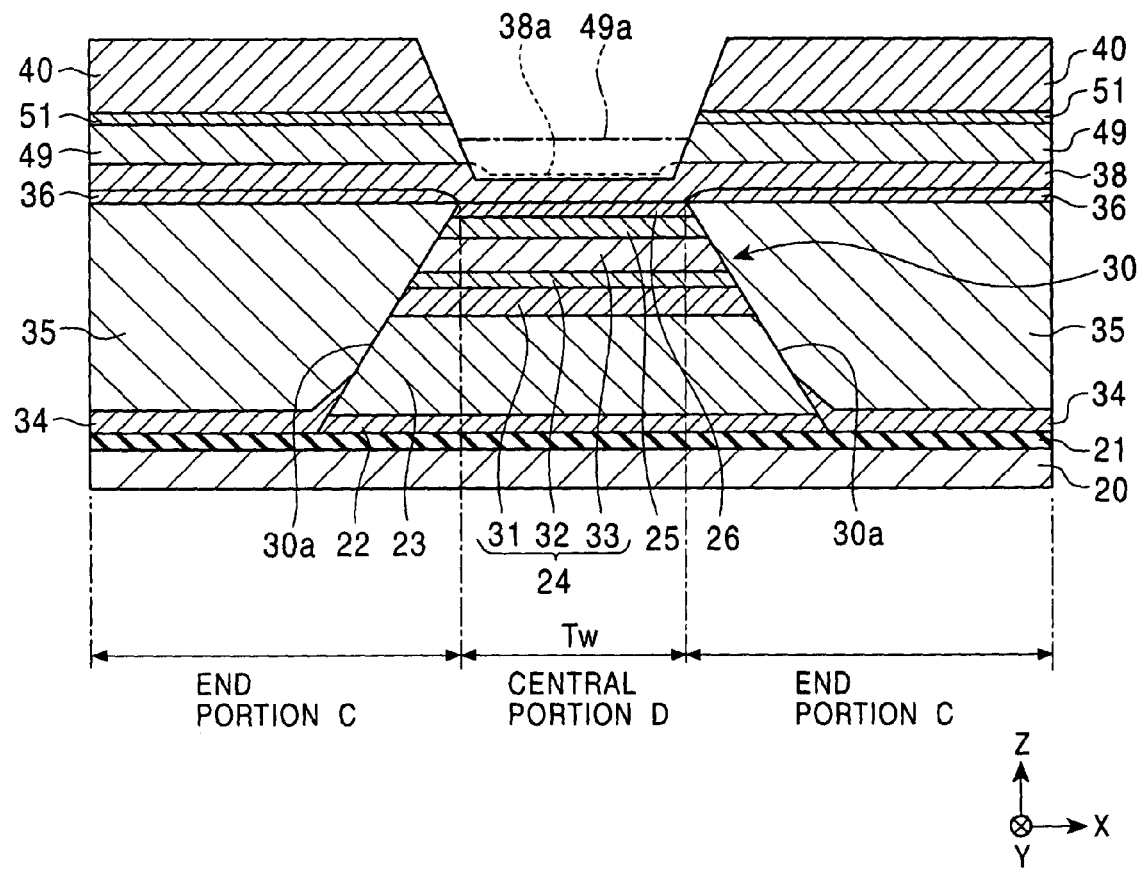
FIG. 19 is a representation of a step following FIG. 18.

In a step shown in FIG. 19, the nonmagnetic interlayer 51 exposed in the space A of the electrode layer 40 and the third antiferromagnetic layer 49 are subjected to ion milling. In FIG. 19, the second free magnetic layer 38 in the central portion D is also slightly cut away by the ion milling. However, the second free magnetic layer 38 in the central portion D may not be affected by the ion milling and it is left at the same thickness as in the end portions C (in this instance, the surface of the second free magnetic layer 38 in the central portion D is designated by reference numeral 38a).

The third antiferromagnetic layer 49 in the element central portion D may be left with a small thickness in the space A (in this instance, the surface of the third antiferromagnetic layer 49 in the central portion D is designated by reference numeral 49a). Preferably, the thickness of the third antiferromagnetic layer 49 in the central portion D is 50 Å or less. When the third antiferromagnetic layer 49 has a small thickness to this extent, an exchange coupling magnetic field is not generated between the third antiferromagnetic layer 49 and the second free magnetic layer 38 in the element central portion D even if second magnetic field annealing is performed. Therefore, the magnetization of the second free magnetic layer 38 in the central portion D is not firmly fixed in the X direction.

The magnetic detecting elements shown in FIGS. 6, 7, and 8 are manufactured by the same methods as in FIGS. 3, 4, and 5, respectively. Since the magnetic detecting elements shown in FIGS. 6 to 8 have a CCP structure, an insulating layer is formed in the region where the electrode layer is disposed in the CIP structure, and electrode layers are provided above and under the multilayer laminate in the thickness direction.

The magnetic detecting element of the present invention is used for not only thin-film magnetic heads intended for use in hard disk drives, but also magnetic heads for tapes and magnetic sensors.

Although the present invention ahs been described using the preferred embodiments, it is not limited to these embodiments and various modifications may be made without departing from the scope of the invention.

Also, the embodiments are intended to describe the invention and do not give any limitation to the scope of the claims of the invention.

What is claimed is:

1. A magnetic detecting element comprising:
a multilayer laminate including a first antiferromagnetic layer, a pinned magnetic layer, a nonmagnetic material layer, and a first free magnetic layer in that order from a bottom thereof;
a pair of second antiferromagnetic layers disposed in a track width direction, respectively, at each side of the multilayer laminate in the track width direction; and
a continuous second free magnetic layer disposed over each upper surface of the pair of second antiferromagnetic layers and an upper surface of the first free magnetic layer; and
a pair of third antiferromagnetic layers above the second free magnetic layer in a region opposing the second antiferromagnetic layer in a thickness direction, respectively.

2. A magnetic detecting element according to claim 1, further comprising a nonmagnetic layer between the first free magnetic layer and the second free magnetic layer.

3. A magnetic detecting element according to claim 2, wherein the nonmagnetic layer comprises at least one element selected from the group consisting of Cu, Ru, Re, Pd, Os, Ir, Pt, Au, Rh, and Cr.

4. A magnetic detecting element according to claim 1, further comprising a pair of ferromagnetic layers between the pair of second antiferromagnetic layers and the second free magnetic layer, respectively.

5. A magnetic detecting element according to claim 4, further comprising a nonmagnetic layer between the pair of ferromagnetic layers and the second free magnetic layer, respectively.

6. A magnetic detecting element according to claim 1, further comprising a specular layer on an upper surface of the second free magnetic layer in at least a region opposing the multilayer laminate in a thickness direction.

7. A magnetic detecting element according to claim 6, wherein the specular layer comprises: an oxide selected from the group consisting of Fe—O, Ni—O, Co—O, Co—Fe—O, Co—Fe—Ni—O, Al—O, Al-Q-O, and R—O; a nitride selected from the group consisting of Al—N, Al-Q'-N and R'—N; or a semimetallic whistler alloy, wherein Q is at least one selected from the group consisting of B, Si, N, Ti, V, Cr, Mn, Fe, Co, and Ni, R is at least one selected from the group consisting of Cu, Ti, V, Cr, Zr, Nb, Mo, Hf, Ta, and W, Q' is at least one selected from the group consisting of B, Si, O, Ti, V, Cr, Mn, Fe, Co, and Ni, and R' is at least one selected from the group consisting of Ti, V, Cr, Zr, Nb, Mo, Hf, Ta, and W.

8. A magnetic detecting element according to claim 1, further comprising a specular layer between the first free magnetic layer and the second free magnetic layer.

9. A magnetic detecting element according to claim 1, further comprising a backed layer on an upper surface of the second free magnetic layer in at least a region opposing the multilayer laminate in a thickness direction.

10. A magnetic detecting element according to claim 9, wherein the backed layer comprises an element selected from the group consisting of Cu, Au, Cr, and Ru.

11. A magnetic detecting element according to claim 1, further comprising a pair of ferromagnetic layers between the pair of third antiferromagnetic layers and the second free magnetic layer, respectively.

12. A magnetic detecting element according to claim 1, further comprising a fourth antiferromagnetic layer between the pair of third antiferromagnetic layers and the second free magnetic layer.

13. A magnetic detecting element according to claim 1, further comprising a nonmagnetic layer in a space between the pair of third antiferromagnetic layers in the track width direction above the pair of second antiferromagnetic layers, respectively.

14. A magnetic detecting element according to claim 1, wherein an angle $\theta 1$ between a lower surface of the multilayer laminate and each side surface of the multilayer laminate is in the range of 60° to 90°.

15. A magnetic detecting element according to claim 1, further comprising a pair of electrode layers above the second free magnetic layer in a region opposing the pair of second antiferromagnetic layer in a thickness direction, respectively.

16. A magnetic detecting element according to claim 1, further comprising:
an upper electrode above the multilayer laminate; and
a lower electrode under the multilayer laminate.

17. A magnetic detecting element according to claim 16, further comprising an insulating layer between the lower electrode layer and the pair of second antiferromagnetic layers and between the pair of second antiferromagnetic layers and each end surface of the multilayer laminate, respectively.

18. A magnetic detecting element according to claim 16, further comprising a pair of insulating layers between the upper electrode layer and the second free magnetic layer in a region opposing the pair of second antiferromagnetic layers in a thickness direction, respectively.

19. A magnetic detecting element according to claim 1, further comprising a pair of insulating layers between an upper electrode layer and the pair of third antiferromagnetic layers, respectively.

* * * * *

UNITED STATES PATENT AND TRADEMARK OFFICE
CERTIFICATE OF CORRECTION

PATENT NO.         : 7,008,703 B2                                         Page 1 of 1
APPLICATION NO. : 10/611555
DATED              : March 7, 2006
INVENTOR(S)       : Naoya Hasegawa et al.

It is certified that error appears in the above-identified patent and that said Letters Patent is hereby corrected as shown below:

In the Claims

Column 31, in claim 1, line 8, after "in the track width direction;" delete "and".

Signed and Sealed this

Seventeenth Day of April, 2007

JON W. DUDAS
*Director of the United States Patent and Trademark Office*